United States Patent
Gan et al.

(10) Patent No.: US 7,027,418 B2
(45) Date of Patent: Apr. 11, 2006

(54) APPROACH FOR SELECTING COMMUNICATIONS CHANNELS BASED ON PERFORMANCE

(75) Inventors: Hongbing Gan, Carlton North (AU); Bijan Treister, Kew (AU); Efstratios Skafidas, Coburg (AU)

(73) Assignee: Bandspeed, Inc., Austin, TX (US)

( * ) Notice: Subject to any disclaimer, the term of this patent is extended or adjusted under 35 U.S.C. 154(b) by 768 days.

(21) Appl. No.: 09/948,488

(22) Filed: Sep. 6, 2001

(65) Prior Publication Data

US 2002/0136268 A1 Sep. 26, 2002

Related U.S. Application Data

(60) Provisional application No. 60/264,594, filed on Jan. 25, 2001.

(51) Int. Cl.
H04Q 7/00 (2006.01)

(52) U.S. Cl. .................. 370/329; 375/132; 455/450

(58) Field of Classification Search ........ 370/328–334, 370/431, 436, 437, 464, 465; 375/132–136; 450/450, 451, 452.1, 452.2
See application file for complete search history.

(56) References Cited

U.S. PATENT DOCUMENTS

| | | | |
|---|---|---|---|
| 4,716,573 A | | 12/1987 | Bergstrom et al. |
| 4,780,885 A | * | 10/1988 | Paul et al. ................. 375/267 |
| 5,323,447 A | | 6/1994 | Gillis et al. |
| 5,394,433 A | * | 2/1995 | Bantz et al. ............... 375/132 |
| 5,418,839 A | | 5/1995 | Knuth et al. |
| 5,541,954 A | | 7/1996 | Emi |
| 5,574,979 A | | 11/1996 | West |
| 5,649,291 A | | 7/1997 | Tayloe |
| 5,726,978 A | * | 3/1998 | Frodigh et al. ............. 370/252 |
| 5,774,808 A | | 6/1998 | Särkioja et al. |
| 5,781,861 A | | 7/1998 | Kang et al. |
| 5,844,522 A | | 12/1998 | Sheffer et al. |
| 5,873,036 A | | 2/1999 | Vucetic |
| 5,898,928 A | | 4/1999 | Karlsson et al. |
| 5,956,642 A | | 9/1999 | Larsson et al. |
| 6,009,332 A | | 12/1999 | Haartsen |
| 6,169,761 B1 | | 1/2001 | Marcoccia et al. |
| 6,240,126 B1 | * | 5/2001 | Ohashi et al. .............. 375/132 |
| 6,549,784 B1 | * | 4/2003 | Kostic et al. ............... 455/501 |
| 6,650,872 B1 | | 11/2003 | Karlsson |
| 6,687,239 B1 | * | 2/2004 | Koprivica .................. 370/341 |

(Continued)

OTHER PUBLICATIONS

Johnsson, HiperLAN/2-The Broadband Radio Transmission Technology Operating in the 5 GHz Frequency Band, pp. 1-22, 1999.*

(Continued)

*Primary Examiner*—Frank Duong
(74) *Attorney, Agent, or Firm*—Hickman Palermo Truong & Becker, LLP

(57) ABSTRACT

An approach for selecting sets of communications channels involves determining the performance of communications channels. A set of channels is selected based on the results of performance testing and specified criteria. The participant generates data that identifies the selected set of channels and provides that data to other participants of the communications network. The participants communicate over the set of channels, such as by using a frequency hopping protocol. When a specified time expires or monitoring of the performance of the channel set identifies poor performance of the set of channels, the participant selects another set of channels for use in communications based on additional performance testing. By selecting channels based on the initial performance testing and performance monitoring, the communications network adaptively avoids channels with poor performance.

128 Claims, 11 Drawing Sheets

U.S. PATENT DOCUMENTS

| | | |
|---|---|---|
| 6,694,147 B1* | 2/2004 | Viswanath et al. ......... 455/517 |
| 6,700,875 B1 | 3/2004 | Schroeder et al. |
| 6,704,346 B1* | 3/2004 | Mansfield .................... 375/136 |
| 6,745,034 B1 | 6/2004 | Wang et al. |
| 6,760,317 B1 | 7/2004 | Honkanen et al. |
| 2002/0122462 A1* | 9/2002 | Batra et al. ................. 375/132 |

OTHER PUBLICATIONS

Zander, Adaptive Frequency Hopping in HF communications, IEEE, pp. 99-105, 1995.*

Lawrey et al.n Adaptive Frequency Hopping for Multiuser OFDM, pp. 1-5, ICICS'99.*

Gan et al, Adaptive Frequency Hopping Implementation Proposals for IEEE 802.15.1/2 WPAN, pp. 1-28, Nov. 2000, downloaded at http://grouper.ieee.org/groups/802/15/pub/2000/Nov00/00367r0P802-15_TG2-Adaptive-Frequency-Hopping.ppt.*

Walter L. Davis, "A MAC Layer submission for the High Rate 802.15.3 Standard," Project: IEEE P802.15 Working Group for Wireless Personal Area Networks (WPANs), Sep. 2000, XP 002220853, pp. 1-57.

Jeyhan Karaoguz, "Multi-Rate QAM Physical Layer (8-40 Mbps) Proposal for High Rate WPAN," Project: IEEE P802.15 Working Group for Wireless Personal Area Networks (WPANs), Oct. 20, 2000, XP002220854, pp. 1-39.

IEE Proc.-Commun., vol. 142, No. 2, Apr. 1995, entitled "Adaptive frequency hopping in HF communications", by J. Zander, PhD and G. Malmgren, MSc, (pp. 99-105).

Fifth International Symposium on Signal Processing and its Applications, ISSPA '99 Brisbane, Australia, Aug. 22-25, 1999, entitled "Multiuser OFDM", by E. Lawrey, (pp. 761-764).

European Patent Office, "Communication pursuant to Article 96(2) EPC," Jun. 22, 2004, 5 pages.

"Clean Version of Amended Claims for Response to Official Comm. From Patent Examiner," EPO Patent Application No. 02709170.1, pp. 1-15.

* cited by examiner

APPROACH FOR SELECTING COMMUNICATIONS CHANNELS BASED ON PERFORMANCE

RELATED APPLICATIONS

This application claims domestic priority from prior U.S. Provisional Patent Application Ser. No. 60/264,594, filed on Jan. 25, 2001, titled "ADAPTIVE FREQUENCY HOPPING—A COEXISTENCE MECHANISM FOR A FREQUENCY HOPPING COMMUNICATION SYSTEM TO COEXIST WITH NON-FREQUENCY-HOPPING COMMUNICATION SYSTEMS SHARING THE SAME FREQUENCY BAND," naming as inventors Hongbing Gan, Bijan Treister, and Efstratios Skafidas, the entire disclosure of which is hereby incorporated by reference for all purposes as if fully set forth herein.

FIELD OF THE INVENTION

The present invention generally relates to communications systems, and more particularly to selecting sets of communications channels based on channel performance.

BACKGROUND OF THE INVENTION

A communications network is any system or mechanism that provides for the exchange of information or data between participants. As used herein, the term "participant" refers to a device or mechanism that communicates with other devices or mechanisms. In some communications network arrangements, one of the participants is designated as a master participant, or simply as the "master." The master generally initiates and controls communications with the other participants, which are conventionally referred to as slave participants, or simply as "slaves." Masters may also be assigned other functions to perform. Although a master participant typically performs additional functions than the other participants, any participant is capable of performing these functions if elected as the master participant.

A frequency hopping (FH) protocol is an approach for wireless communications in a communications network that uses a frequency hopping signal transmission technique in which information or data is transmitted over a set of frequencies in a communications frequency band. A frequency hopping communications system is a system that uses a FH protocol. The order in which the communications network hops among the set of frequencies is known as the hopping sequence.

In contrast to FH systems, a non-frequency hopping (NFH) system is simply a communications system whose carrier does not hop over a set of frequencies. A typical NFH system may occupy a portion of the communications frequency band corresponding to several frequencies used by an FH system.

With the FH approach, the frequency band is broken up into separate frequencies, often referred to as "channels." The FH system transmits data on one channel, hops to the next channel in the hopping sequence to transmit more data, and continues by transmitting data on subsequent channels in the hopping sequence. The switching of frequencies may occur many times each second. The use of an FH protocol helps to reduce problems with interference from other communications systems and other interference sources. Frequency hopping also helps with fading of transmissions and power consumption and also provides security for the transmission so that others may not intercept the data being transmitted because others do not know the hopping sequence. An example of a frequency hopping protocol is the Institute of Electrical and Electronics Engineers (IEEE) 802.15.1 Wireless Personal Area Network Standard, which is based on the Bluetooth™ wireless personal area network (WPAN) technology from the Bluetooth Special Interest Group. The BLUETOOTH trademarks are owned by Bluetooth SIG, Inc., U.S.A. The Bluetooth protocol uses 79 individual randomly chosen frequency channels numbered from 0 to 78 and changes the frequencies 1600 times per second. Examples of NFH systems include the IEEE 802.11 b Wireless Local Area Network (WLAN) and the IEEE 802.15.3 next-generation WPAN, both of which operate in the 2.4 GHz Industrial, Scientific, Medical (ISM) band, which is an unlicensed portion of the radio spectrum that may be used in most countries by anyone without a license.

An FH communications system may be either point-to-point, meaning that communications paths are provided from one participant to another participant, or point-to-multipoint, meaning that communications paths are provided from one participant to multiple participants.

Typically one device of the network, such as the master, determines the hopping sequence that will be used by all participants of the network. The other participants of the network, such as slaves, are time synchronized with the master to maintain communications with the master. For example, the Bluetooth and IEEE 802.15.1 frequency hopping protocols are point-to-multipoint systems in which the frequency hopping sequence is determined by the physical address of the master and the phase of hopping is determined by the master's clock. The "physical address" of the master is a unique identifier, such as a media access control (MAC) address, that identifies the device anywhere in the world on a network.

Some FH communications system are configured such that certain devices transmit at specified times or timeslots. For example, slaves may respond to the master at assigned timeslots. As another example, in a Bluetooth FH communications system, the master may transmit at even-numbered timeslots on the hopping sequence and the slaves listen at those regular intervals. The master will address one slave (or all slaves in a "broadcast" mode), and the addressed slave returns back to the master at the next odd-numbered timeslot.

A preamble, which is known to all the participants of the FH network, is used to identify the network and for the slaves to synchronize with the master. For example, in Bluetooth and IEEE 802.15.1, the known preamble is called the "channel access code."

One problem with frequency hopping communications systems is that coexistence problems arise between the FH communications system and NFH communications systems that operate in the same frequency band. While the FH communications system hops over the entire frequency band, the NFH communications systems occupy separate parts of the frequency band. When the FH communications system hops over part of the frequency band occupied by an NFH communications system, there may be interference between the systems. Although the use of a FH protocol helps to lessen the interference problem because not all of the FH channels will interfere with other communications systems, there nevertheless remains interference on those channels that coincide with the NFH communications systems. An example of the interference situation is the coexistence problem between the frequency hopping IEEE 802.15.1 WPAN and the non-frequency hopping IEEE 802.11b Wireless Local Area Network (WLAN) because both share the 2.4 GHz ISM band.

Further, because of the dynamic nature of interference due to the use of devices at different times and locations, eventually all FH channels will experience some degree of interference at some time. Interference may change depending on when the communications systems use the band and the relative locations of the participants of each system to participants of another system. Because the participants may be mobile, interference may vary depending on the movements of the participants of one system relative to the locations of participants of other systems. In addition, interference may arise from other sources, such as some consumer appliances like microwave ovens, resulting in a degradation of performance of the FH communications system.

Interference results in data transmission errors, such as an increase in the bit error rate (BER) or the loss of data packets, resulting in reduced transmission quality and performance and the need to retransmit the data.

One approach for managing the coexistence problem is to increase the power used in the transmissions so that the other interfering system have less of an impact on the system transmitting at the increased power. However, this increased power approach drains batteries used by the participants, and thus the required power increase may be impractical. Also, the increased power approach only benefits the system using the increased power and results in a bigger interference impact on other systems.

Another approach for managing the coexistence problem is to skip a "bad" channel that suffers from interference, such as by moving onto the next channel in the sequence or by jumping to another randomly selected channel. However, this skipping approach does not necessarily avoid other bad channels because the next channel used may also have an interference problem. Also, known "bad" and "good" channels may change over time due to the transient nature of some types of interference.

Based on the need for wireless communications and the limitations of conventional approaches, an approach for managing interference in communications system, such as the coexistence problem between frequency hopping communications systems and non-frequency hopping communications systems, that does not suffer from the limitations of the prior approaches is highly desirable.

SUMMARY OF THE INVENTION

Techniques are provided for selecting sets of communications channels based on channel performance. According to one aspect of the invention, a method selects communications channels for a communications system. A set of communications channels is selected based on the performance of the communications channels and channel selection criteria. Then another set of communications channels is selected based on a later performance of the communications channels and the channel selection criteria.

According to another aspect of the invention, a method is provided for communicating with a participant. A set of communications channels is selected based on the performance of the communications channels and a performance criterion. Identification data that identifies the set of communications channels is generated and provided to the participant. The set of communications channels is used for communicating with the participant according to a frequency hopping protocol. According to other aspects, another set of communications channels is selected in a similar manner when a specified criterion is satisfied, including but not limited to, after expiration of a specified length of time, when the performance of at least one of the channels in the set of channels satisfies another performance criterion, or when a specified number of the set of channels satisfies yet another performance criterion.

According to one aspect of the invention, a communications device is used in a network that communicates via a frequency hopping protocol. The communications device includes a memory that has identification data that identifies a set of communications channels that is selected based on channel performance and a performance criterion. The communications device includes a transceiver that is communicatively coupled to the memory and that is configured to transmit and receive, based on the identification data, over the set of channels, according to a frequency hopping protocol. The communications device includes a processor for generating a measurement of channel performance based on receiving a packet from another device and transmitting another packet to the other device that contains data indicating the measurement of channel performance.

According to another aspect, another communications device is used in a network that communicates via a frequency hopping protocol. The communications device includes a memory for storing sequences of instructions and a processor communicatively coupled to the memory. When the processor executes the instructions, the instructions cause the processor to determine the performance of communications channels and then select a set of channels based on the performance and a performance criterion. The processor generates and stores in the memory data that identifies the set of channels and transmits the data to another communications device. The communications device includes a transceiver that is communicatively coupled to the memory and that is configured to transmit and receive, based on the data, over the set of channels according to a frequency hopping protocol.

According to another aspect of the invention, a communications channel selector apparatus is provided. The apparatus is configured to determine channel performance at one time and select based on that performance a set of channels based on channel selection criteria. The apparatus is configured to then determine the channel performance at a later time and select another set of channels based on that latter performance and the channel selection criteria.

According to other aspects, the invention encompasses a system, a computer-readable medium, and a carrier wave configured to carry out the foregoing functions.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION OF THE INVENTION

An approach for selecting sets of communications channels based on channel performance is described. In the following description, for the purposes of explanation, numerous specific details are set forth in order to provide a thorough understanding of the present invention. It will be apparent, however, that the present invention may be practiced without these specific details. In other instances, well-known structures and devices are depicted in block diagram form in order to avoid unnecessarily obscuring the present invention.

In the following description, various embodiments of the invention are described in the following sections:

I. OVERVIEW
II. TESTING CHANNEL PERFORMANCE
  A. Special Test Packets
  B. Received Signal Strength Indicator (RSSI)
  C. Preamble Correlation
  D. Header Error Check (HEC)
  E. Cyclic Redundancy Check (CRC)
  F. Packet Loss Ratio (PLR)
  G. Forward Error Correction (FEC)
  H. Other Channel Performance Testing Considerations
III. CHANNEL CLASSIFICATION
IV. COMMUNICATING SELECTED CHANNELS TO PARTICIPANTS
V. IMPLEMENTING ADAPTIVE FREQUENCY HOPPING
VI. MONITORING CHANNELS
VII. MESSAGE SEQUENCING AND EXAMPLE IMPLEMENTATION
VIII. IMPLEMENTATION MECHANISMS I. Overview A novel approach for managing network communications generally involves selecting sets of communications channels based on channel performance. An initial set of channels is selected based on one or more selection criteria at the start-up of the communications network. Additional sets of channels are then periodically selected to adaptively avoid interference.

Figure 1A:
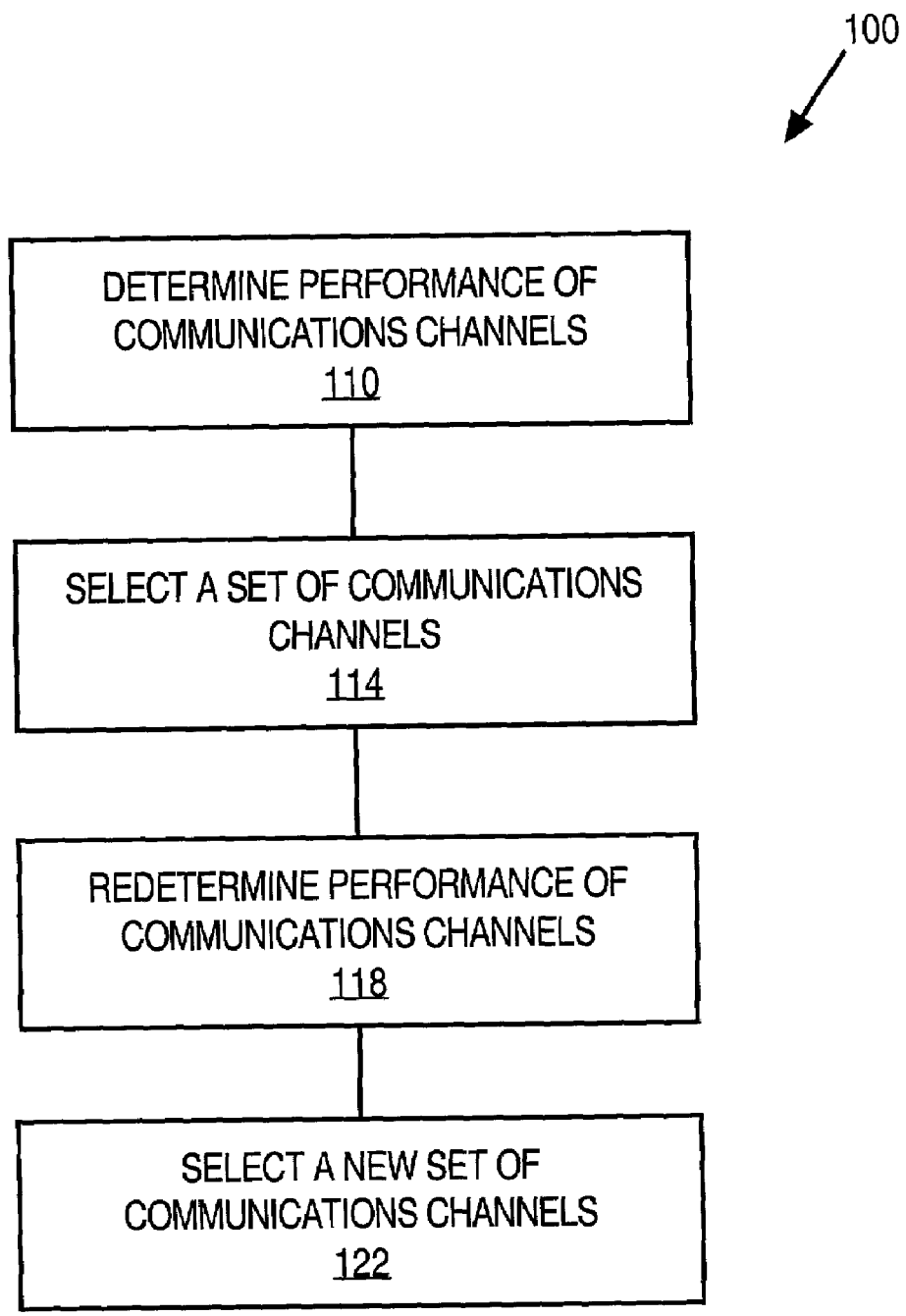
FIG. 1A is a flow diagram that depicts an approach for selecting sets of communications channels based on channel performance, according to an embodiment of the invention.

FIG. 1A is a flow diagram that depicts an approach for selecting sets of communications channels based on channel performance, according to an embodiment of the invention. In block 110, the performance of a set of available communications channels is determined. For example, for a communications system that uses 100 channels, some or all of the 100 channels may be tested to determine channel performance. Other systems using the same frequency band may interfere with several of the 100 channels.

In block 114, a set of communications channels to be used is selected based on the channel performance determined in block 110, one or more performance criteria, and one or more selection criteria. For example, a communications system may experience interference on channels 3 through 5 from one communications system and on channels 50 through 54 from another communications system. The channel testing may indicate a high bit error rate (BER) on those channels. Channels may be classified by comparing the test results to the performance criteria. For example, the performance criteria may be a specified value, or a specified threshold. If the BER for a channel exceeds the specified threshold, the channel is classified as "good," whereas channels with a BER that does not exceed the specified threshold are classified as "bad." The reason why a bad channel's performance does exceed the specified threshold may be due to a variety of reasons, including but not limited to, the channel being used by another communications system or noise from other interference sources, such as microwave ovens.

After classifying the performance of the channels, a set of channels is selected based on the selection criteria. For example, the selection criteria may be to select the good channels but not the bad channels. Thus, by selecting the set of good communications channels, the communications system performing the channel selection may avoid interference present on the bad channels.

Although this example describes the use of a particular type of performance criteria to classify channels and particular type of selection criteria to select from the classified channels, other approaches may be used to select a set of channels. For example, channels may be selected based on comparing performance results to one or more criteria without first classifying the channels. Also, other criteria may be used, for example, that particular channels are, or are not, to be selected regardless of the test results.

In block 118, the performance of the communications channels is determined again by additional testing. This additional testing may be initiated according to a specified schedule, such as the expiration of specified time period, or the additional testing may be initiated as a result of monitoring and detecting new interference among the selected set of channels, such as from another communications system that previously did not cause interference. For example, in the communications system example above, the additional testing may be performed over some or all of the original 100 channels.

In block 122, a new set of communications channels is selected based on the channel performance determined in block 118 in a manner similar to that of block 114 above. For example, the new set of channels may be based on selecting channels that are good when the additional testing of block 118 is performed. The new set of channels may be different than the good channels selected in block 112 because new interference typically may be present from other systems that were not being used at the time of the first testing of block 110 or that were not in sufficient proximity at the time of the first testing of block 110 to cause sufficient interference to result in the channels being classified as bad.

According to other aspects of the invention, the determination and re-determination of channel performance depicted by blocks 110 and 118 may be performed by a different entity or device than the selection of the channels depicted in blocks 114 and 122. In general, each step may be performed by a different entity, and a particular entity may perform any number of the steps of a particular embodiment of the invention.

The determination of channel performance and the selection of a new set of communications channels depicted by blocks 118 and 122, respectively, may be repeated based on the same types of reasons as discussed above for block 118. As a result, the method depicted in FIG. 1A may adaptively avoid interference, even if the interference changes over time, by periodically retesting channel performance and selecting new sets of communications channels to avoid using channels with unacceptable performance.

This approach avoids interference, such as from the coexistence problem between different communications systems that use the same part of a communications band, by testing performance of communications channels to determine a set of channels that have acceptable performance according to one or more performance criteria.

By using this novel approach to adaptively select sets of communications channels based on channel performance at various times, interference problems are reduced and transmission performance is improved for both the communications system that selects a set of communications channels to use and other interfering communications systems. Also, by reducing interference, the power level required to achieve a specified transmission quality is decreased, thereby increasing battery life of mobile devices. The approach described herein may be characterized as "robust" because interference in a communications system is reduced or eliminated by using channels that have been tested and determined to be "good" because channel performance exceeds a specified threshold as compared to channels that have been tested and determined to be "bad" because channel performance falls below the specified threshold. The approach described herein is a simple scheme that is easy to implement on many devices (due to the low computational requirements), that requires little memory, and that is fully interoperable with devices that do not support this novel approach.

Figure 1B:
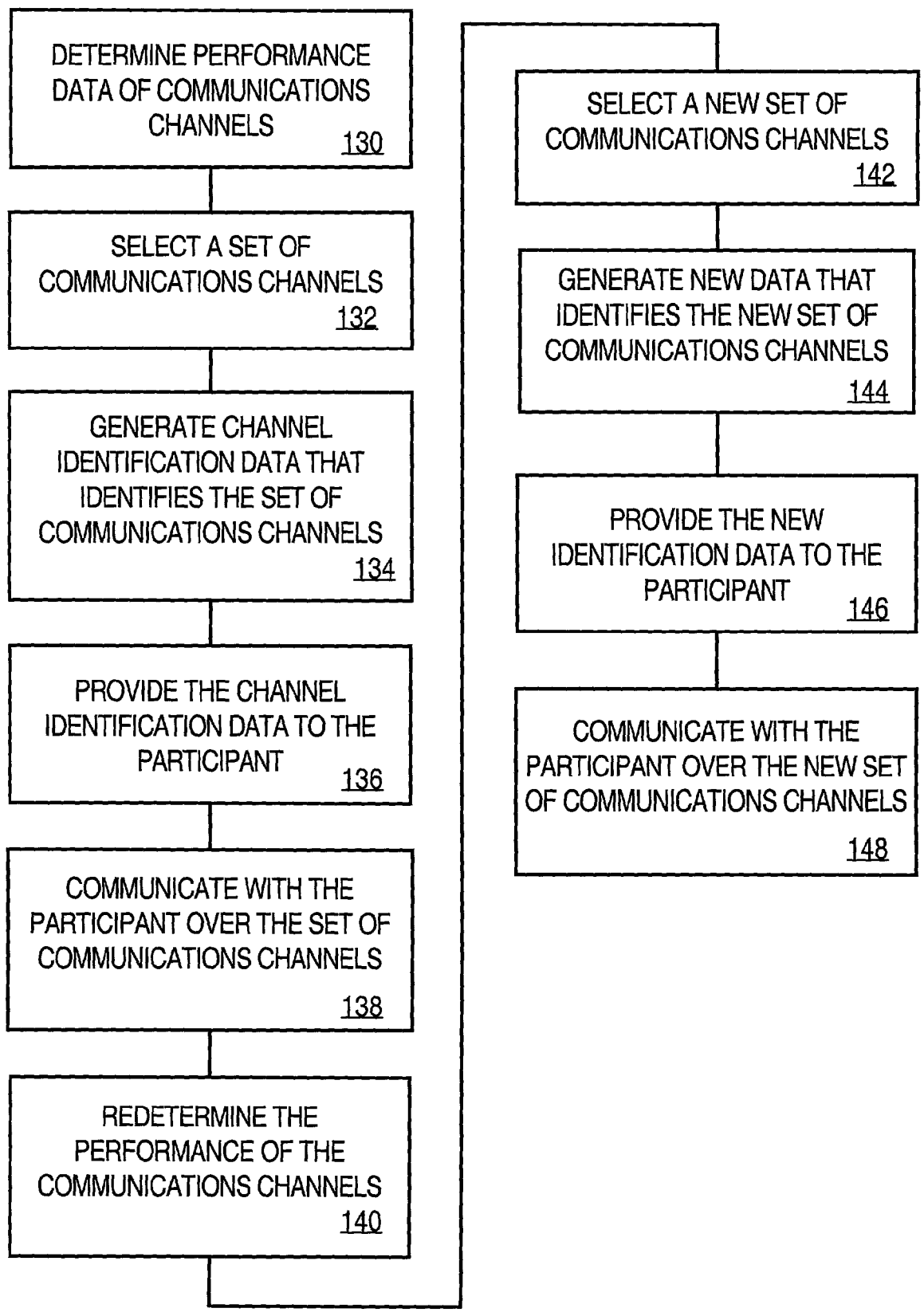
FIG. 1B is a flow diagram that depicts an approach for communicating with a participant using a set of good channels, selected according to an embodiment of the invention.

FIG. 1B is a flow diagram 100 that depicts an approach for communicating with a participant using a set of good channels, selected according to an embodiment of the invention. In block 130, performance data for communications channels is determined. For example, in a Bluetooth or an IEEE 802.15.1 FH communications system, some or all of the 79 channels may be tested to determine a received signal strength indication (RSSI) or by checking transmission quality based on transmission errors.

In block 132, a set of communications channels is selected by comparing the performance data determined in block 130 to performance criteria to determine whether each channel is good or bad. Then a set of channels is selected that includes only good channels. For example, channels 25–30 of the original 79 channels of the Bluetooth or IEEE 802.15.1 FH communications system examples above may be classified as bad due to interference from an NFH communications system, resulting in the selection of channels 0–24 and 31–78 for the channel set.

In block 134, channel identification data is generated that identifies the set of selected communications channels. For example, in the Bluetooth or IEEE 802.15.1 FH communications system examples above, a reduced frequency hopping sequence that uses good channels 0–24 and 31–78 may be selected, or alternatively, bad channels 25–30 may be replaced by randomly-selected good channels in the normal hopping sequence.

In block 136, the channel identification data identifying the selected set of communications channels is provided to the participant. For example, in the Bluetooth or IEEE 802.15.1 FH communications system examples above, the master may provide a slave with information on which channels are selected and/or not selected in block 132 (e.g., channels 0–24 and 31–78).

In block 138, the set of communications channels is used to communicate with the participant. For example, in the Bluetooth or IEEE 802.15.1 FH communications system examples above, a master may communicate with the slave using the set of selected channels as identified in the identification data generated in block 134.

In block 140, the performance of the communications channels is redetermined. The performance determination in block 140 may be in a manner similar to, or different from, that of the original performance determination in block 130. The redetermination of channel performance in block 140 may be initiated based on a number of criteria. For example, the new testing may be performed at periodic intervals, when interference is detected on the selected set of communications channels, or when the available number of good channels falls below a specified number.

In block 142, a new set of communications channels is selected based on the testing performed in block 140 and specified performance criteria to determine which channels are currently good and which are bad. For example, in the Bluetooth or IEEE 802.15.1 FH communications system examples above, a mobile NFH communications system that previously caused interference may no longer be a problem if the NFH communications system is no longer operating or has moved away from the FH communications system. Also, another previously undetected NFH communications system may be causing interference for the opposite reason. For this example, assume that the NFH communications system causing interference on channels 25–30 is no longer a problem because the NFH communications system has moved, but also assume that another FH communications system is now active and causing interference on channels 3, 22, 48, and 53.

In block 144, data is generated, which identifies the new set of communications channels. For example, in the Bluetooth or IEEE 802.15.1 FH communications system examples above, a smaller frequency hopping sequence that does not use channels 3, 22, 48, and 53 may be selected, or channels 3, 22, 48, and 53 may be replaced by good channels in the normal hopping sequence.

In block 146, the data identifying the new selected set of communications channels is provided to the participant. For example, in the Bluetooth or IEEE 802.15.1 FH communications system examples above, the master may provide a slave with a hopping sequence based on the new channels selected in block 142.

In block 148, the new set of communications channels is used to communicate with the participant. For example, in the Bluetooth or IEEE 802.15.1 FH communications system examples above, a master may communicate with the slave using the set of selected channels as identified in the identification data generated in block 144.

The steps in blocks 140–148 may be repeated as necessary depending on the requirements of a particular application or implementation. As a result, the approach may be used to adaptively select sets of communications channels that provide a specified channel performance, thereby avoiding interference with other communications systems and other sources of interference.

According to another embodiment of the invention, a new set of communications channels is used to supplement an existing set of communications channels. In contrast to the approach above in which the second set of channels is determined by retesting all possible channels and then using the second set in place of the first set (or in place of a default set), a specified number of channels may be randomly selected for testing, and if found to have acceptable performance, used to add to those channels of the first set that still have acceptable performance.

Figure 2:
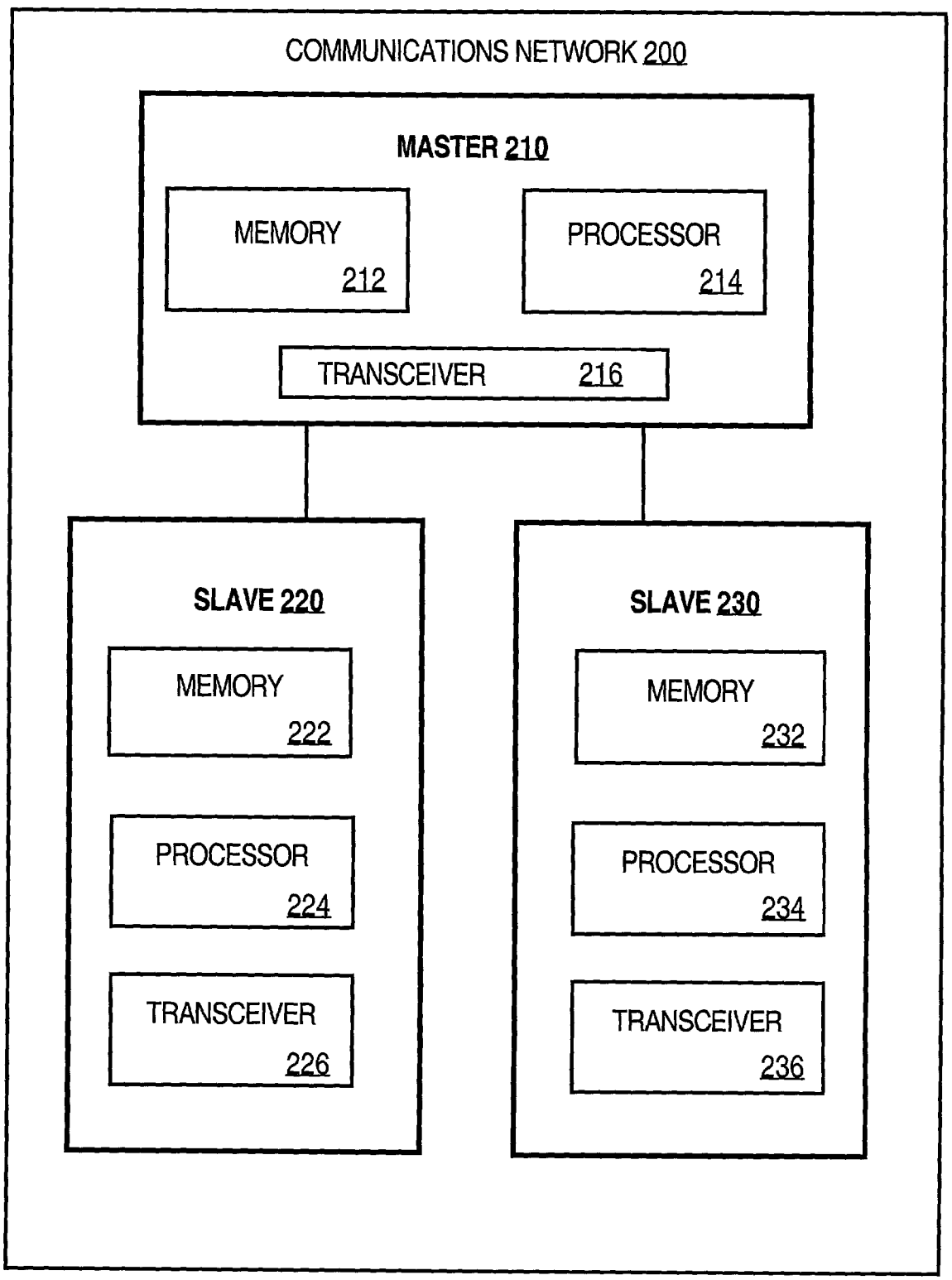
FIG. 2 is a block diagram that depicts a communications network, according to an embodiment of the invention.

FIG. 2 is a block diagram that depicts a communications network 200, according to an embodiment of the invention. For clarity, FIG. 2 depicts a small number of communications devices, whereas in practice any number of such communications devices may be used. Examples of communications devices that may be used in a network that uses the channel selection approach described herein include, but are not limited to, wireless devices that are used in wireless local area networks (WLANs) and in wireless personal area networks (WPANs), such as cordless phones, laptop computers, desktop computers, printers, and personal digital assistants (PDAs). Wireless devices may communicate in a variety of ways, including but not limited to, infrared, line of sight, cellular, microwave, satellite, packet radio and spread spectrum technologies. Some communications devices may be characterized as mobile devices based on the relative ease of moving such devices between locations or because the mobile devices may be conveniently carried by a person, such as cordless phones, laptop computers, and PDAs.

Communications network 200 includes a master 210 and slaves 220, 230. Master 210 includes a memory 212 that may be used to store instructions, a processor 214 that may execute the instructions stored in memory 212, and a transceiver 216 that is configured to transmit and receive communications between master 210 and other devices of communications network 200, such as slaves 220, 230.

Slaves 220, 230 include a memory 222, 232, a processor 224, 234 and a transceiver 226, 236, respectively, that perform functions similar to the corresponding elements of master 210.

According to one embodiment of the invention, master 210 selects, as described herein, a set of communications channels from the default communications channels for a specified communications protocol, generates identification data for the selected set of channels, and transmits the identification data to slave 220, such as by using the approach of FIG. 1B.

However, slave 230 may not be capable of using the selected set of channels. For example, slave 230 may not be configured to use a selected set of good channels sent by master 210. As a result, master 210 communicates with slave 220 using the selected set of communications channels and communicates with slave 230 using the default communications channels for the specified communications protocol. For example, if a FH communications protocol is used, master 210 and slave 220 communicate by hopping over the selected set of good communications channels, while master 210 and slave 230 communicate by hopping over the default communications channels for the FH protocol.

II. Testing Channel Performance

According to one embodiment of the invention, channel performance is monitored using one or more channel performance measurement techniques. For example, any of the techniques for measuring channel performance that are discussed below may be used alone or in combination. Different methods may be used for testing channels to select a set of communications channels and to monitor the performance of the selected set of communications channels, depending on the requirements of a particular application or implementation. Although testing is normally performed on all possible communications channels, it is not necessary to test all channels, nor is it necessary to use the same method for determining or monitoring performance of different channels.

A. Special Test Packets

According to one embodiment of the invention, special test packets containing known content are used to test the performance of communications channels. As used herein, a "packet" is a block of data used for transmissions in a packet-switched system. For example, packets may include a preamble, a header, a payload, and a tail, alone or in any combination.

The number of error bits (NEB) that occur in the known content of the special test packets may be calculated to determine channel performance. For channels in which there is interference, such as from another communications system, the NEB will be high as a result of the interference. Conversely, if there is no interference, the NEB will be low.

For example, a slave may calculate the NEB for a transmission from a master to the slave and include the result in a subsequent transmission from the slave to the master. In addition to receiving the calculated NEB from the slave in the subsequent transmission, the master may calculate the NEB for the transmission from the slave to the master based on the subsequent transmission. As a result, performance in both directions of communications may be measured, which may be important because interference may occur to differing degrees in each direction depending on many factors, such as the relative locations of the master and slave to a source of interference.

Figure 3A:
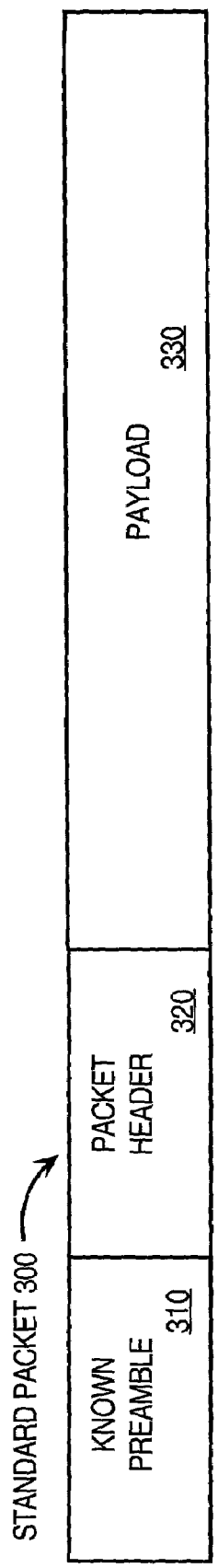
FIG. 3A is a block diagram that depicts an example format of a standard packet, according to an embodiment of the invention.

FIG. 3A is a block diagram that depicts an example format of a standard packet 300, according to an embodiment of the invention. Standard packet 300 is for a Bluetooth or an IEEE 802.15.1 FH communications system. Standard packet 300 includes a known preamble 310, a packet header 320, and a payload 330.

Known preamble 310 is used to identify the FH communications network and for the slaves to synchronize with the master. Known preamble 310 is a binary string of data whose length depends on the communications protocol. For example, for a Bluetooth based FH communications system, known preamble 310 is 72 bits in length.

Packet header 320 contains control information, such as the origination and destination address of the packet, the type of packet, and the priority level for the packet.

Payload 330 contains the contents or data being carried by standard packet 300, as compared to the control information, or overhead, of packet header 320.

Figure 3B:
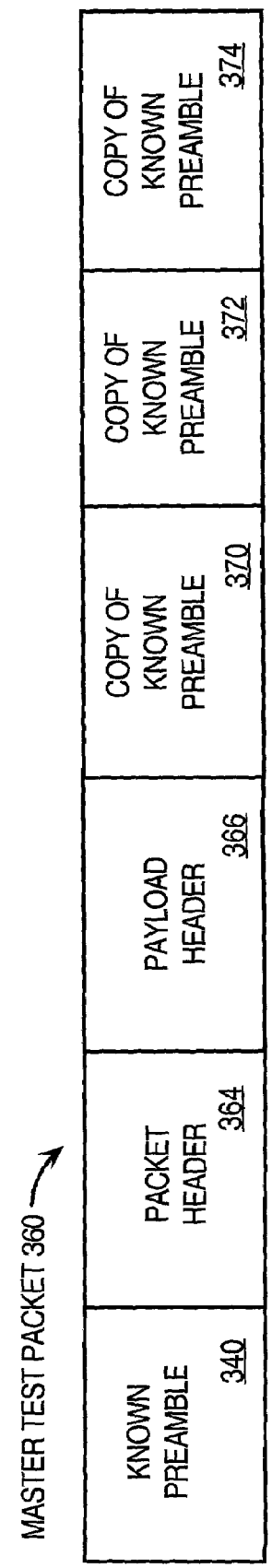
FIG. 3B is a block diagram that depicts a master test packet that is sent by a master to slaves to test channel performance, according to an embodiment of the invention.

FIG. 3B is a block diagram that depicts a master test packet 360 that is sent by a master to slaves to test channel performance, according to an embodiment of the invention. Master test packet 360 includes a known preamble 340, a packet header 364, a payload header 366, and copies of known preamble 370, 372, 374.

Known preamble 340 is analogous to known preamble 310 of FIG. 3A, but known preamble 340 is unique for the FH communications system that uses master test packet 360.

Packet header 364 is analogous to packet header 320 in FIG. 3A, but may differ based on the content of master test packet 360, such as the particular original and destination addresses of the packet.

Payload header 366 contains control information relating to the payload portion of master test packet 360, such as the type of data contained in the payload. For the example depicted in FIG. 3B, payload header 366 identifies that the payload of master test packet 360 contains a specified number of copies of known preamble 340, depicted as copies of known preamble 370, 372, 374. Although master test packet 360 is depicted and described as including three copies of the known preamble 370, 372, 374, any number of copies may be used, subject to the capacity limits of the payload portion of the packet, and the payload portion of the packet may contain other data besides copies of the known preamble.

By including copies of known preamble 370, 372, 374 in the payload of master test packet 360, the slave that receives master test packet 360 may calculate the number of error bits (NEB) that occur in copies of known preamble 370, 372, 374 and in known preamble 340. For example, in a Bluetooth based FH communications system, such as Bluetooth or IEEE 802.15.1, the known preamble is referred to as the channel access code, which has a length of 72 bits. Based on the channel access code at the start of a packet and the three copies of the channel access code in the packet payload sent from the master to the slave, there are 288 bits of data to test channel performance based on the NEB.

Figure 3C:
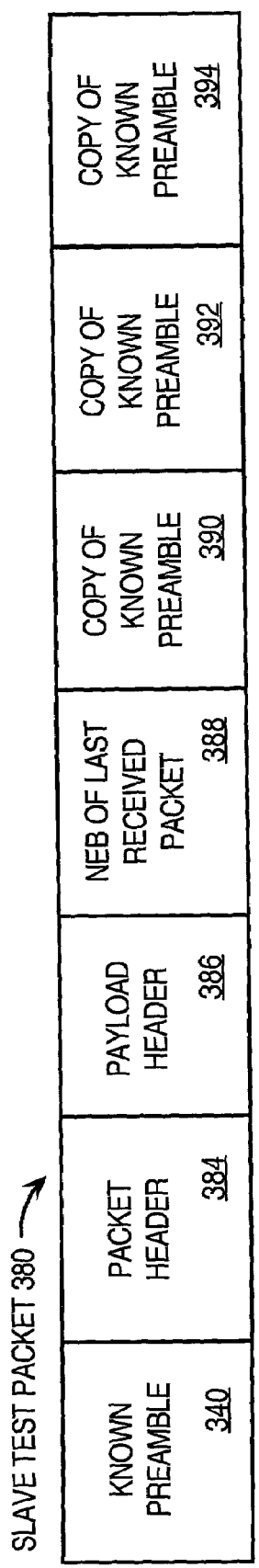
FIG. 3C is a block diagram that depicts a slave test packet that is sent by a slave to a master to provide channel performance measurements and to test channel performance, according to an embodiment of the invention.

FIG. 3C is a block diagram that depicts a slave test packet 380 that is sent by a slave to a master to provide channel performance measurements and to test channel performance, according to an embodiment of the invention. Slave test packet 380 includes a known preamble 340, a packet header 384, a payload header 386, an NEB of last received packet 388, and copies of known preamble 390, 392, 394.

Known preamble 340 of slave test packet 380 may be the same as that of master test packet 360, provided that master test packet 360 and slave test packet 380 are sent between participants of the same FH communications system.

Packet header 384 and payload header 386 are analogous to packet header 364 and payload header 366, respectively, with differences arising from the type of packet (e.g., master to slave or slave to master) and packet contents (e.g., slave test packet 380 contains NEB of last received packet 388).

Slave test packet 380 includes the NEB of last received packet 388 that contains the NEB calculated by the slave for the last packet sent by the master to the slave, such as master test packet 360. The NEB of last received packet 388 is used to pass back from the slave to the master the information on the performance of the master to slave transmission over the particular channel used to send master test packet 360.

In addition, by including copies of known preamble 390, 392, 394 in the payload of slave test packet 380, the master that receives slave test packet 380 from a slave may calculate the NEB that occur in copies of known preamble 390, 392, 394 and known preamble 340. As discussed above, channel performance may differ between transmissions from master to slave and from slave to master, for example, if an interference source is closer to one participant than the other. Although slave test packet 380 is depicted and described as including three copies of the known preamble 390, 392, 394, any number of copies may be used, subject to the capacity limits of the payload portion of the packet.

Each channel of a communications system may be tested repeatedly by using master test packet 360 and slave test packet 380 described herein. For example, in a Bluetooth or IEEE 802.15.1 FH communications system, the frequency hopping rate is 1,600 hops per second, and there are 79 channels. Therefore, in one second, each of the 79 channels may be tested both from the master to the slave and from the slave to the master 20 times.

Use of special test packets, such as master test packet 360 and slave test packet 380, may be well suited for initial channel testing because many separate and detailed tests may be made of each channel in a short amount of time. In addition, channel performance is measured on a scale from an NEB value of 0 to an NEB value corresponding to every test bit being in error, thereby providing a range of channel performance measurements. While the overhead associated with such detailed testing may be relatively high compared to other methods described below, such detailed testing is not generally performed frequently enough to make the overhead prohibitive.

B. Received Signal Strength Indicator (RSSI)

According to another embodiment of the invention, a received signal strength indicator (RSSI) is used to test the performance of communications channels. To determine the RSSI for a channel, a master can either just listen at a slave transmission time slot or the master or send a NULL packet to a slave to ensure that the slave will not transmit at the next slave transmission time slot. A NULL packet generally includes only an access code and a packet header and is typically used to ensure that the master and slave are synchronized. When a slave receives a NULL packet, there is no return packet sent from the slave to the master.

By listening to the return channel from the slave, the signal received by the master represents the noise floor of the channel because the slave is not transmitting on the channel. If there is interference, such as from another communications system, the RSSI will be high. Conversely, if there is no interference, the RSSI will be low. Using this approach with a Bluetooth or IEEE 802.15.1 communications system, in one second a master may perform 10 RSSI measurements for each of the 79 channels.

Use of RSSI may be well suited for initial channel testing because many separate and detailed tests may be made of each channel in a short amount of time. According to one embodiment of the invention, channel performance is measured on a scale from very low RSSI values to very high RSSI values corresponding to the noise level measured on the channel, thereby providing a range of channel performance measurements. While the overhead associated with such detailed testing may be relatively high compared to other methods described below, such detailed testing is not generally performed frequently enough to make the overhead prohibitive.

C. Preamble Correlation

According to another embodiment of the invention, the known preamble at the start of the packet is used to test the performance of communications channels. The preamble correlation approach is similar to the special test packet approach above, but without the use of copies of the known preamble in the payload portion of the packet. The master may use identification packets, NULL packets, POLL packets, or any other kind of packet and correlate the received preamble against the known preamble. A packet that does not pass the correlation is discarded (e.g., it is a lost packet).

Use of the preamble correlation approach may be well suited for continuous monitoring of channel performance, such as the ongoing monitoring of a selected set of communications channels, because no special packets are required and therefore the overhead is relatively low compared to other approaches that require additional packets. However, the result of each measurement is whether the packet is discarded (or lost) or not, thus providing limited granularity because a one bit error provides the same result of a lost packet and a multiple bit error. Also, because one copy of the known preamble is used instead of multiple copies, there are fewer bits being used to detect interference problems. This increases the likelihood that a "bad" channel is mischaracterized as a "good" channel.

D. Header Error Check (HEC)

According to another embodiment of the invention, a header error check (HEC) is used to test the performance of communications channels. The HEC is a check on the contents of the packet header, such that if an error occurs in the packet header, the HEC does not check and the packet is discarded (e.g., it is a lost packet).

Use of the HEC approach may be well suited for continuous monitoring of channel performance, such as the ongoing monitoring of a selected set of communications channels, because no special packets are required and therefore the overhead is relatively low compared to other approaches that require additional packets. However, the result of each measurement is whether the packet is discarded (or lost) or not, thus providing limited granularity because a one bit error provides the same result of a lost packet and a multiple bit error.

E. Cyclic Redundancy Check (CRC)

According to another embodiment of the invention, a cyclic redundancy check (CRC) is used to test the performance of communications channels. The CRC may be a check of either the payload of the packet or the complete contents of the packet, depending on the communications system protocol being used. As an example, in Bluetooth and IEEE 802.15.1, the data packet must pass a CRC check, otherwise the packet must be retransmitted. A retransmission request (RR) indicates poor channel performance.

Use of the CRC approach may be well suited for continuous monitoring of channel performance, such as the ongoing monitoring of a selected set of communications channels, because no special packets are required and therefore the overhead is relatively low compared to other approaches that require additional packets. However, the result of each measurement is whether there is a retransmission request or not, thus providing limited granularity because a one bit error provides the same result of a lost packet and a multiple bit error. However, as compared to other types of data checks, the CRC provides more bits for testing because either the payload or the entire packet is used to check for errors, instead of just a portion of the packet (e.g., just the header for HEC).

F. Packet Loss Ratio (PLR)

According to another embodiment of the invention, a packet loss ratio (PLR) is used for channel performance testing of transmissions between participants of a communications system. A packet loss may occur when a specified condition is satisfied, including but not limited to, a failure of the preamble correlation, HEC, or CRC. PLR may be well suited for both initial channel testing and continuous monitoring of channel performance.

G. Forward Error Correction (FEC)

According to another embodiment of the invention, forward error correction (FEC) is used for channel performance testing of transmissions between participants of a communications system. FEC may be performed on the packet header or on the payload of the packet. FEC is used as a form of redundant data encoding to allow the recipient to ensure the integrity of the received data and to correct any identified errors. As an example, in Bluetooth or IEEE 802.15.1, the packet header is ⅓ FEC coded, and the payload is ⅔ FEC coded. The FEC coding may be used for both an NEB calculation and for error correction.

Use of the FEC approach may be well suited for continuous monitoring of channel performance, such as the ongoing monitoring of a selected set of communications channels, because no special packets are required and therefore the overhead is relatively low compared to other approaches that require additional packets. While the result of each measurement provides more granularity via an NEB measurement than some of the other methods above, there is more overhead associated with FEC and less information may be included in each packet due to the redundant data encoding.

H. Other Channel Performance Testing Considerations

Although the descriptions of each channel performance measurement technique above describes the use of the same method for both master to slave and slave to master transmissions, different methods may be used for each transmission direction. For example, the RSSI approach may be used for master to slave transmissions while the preamble correlation is used for slave to master transmissions. Also, different methods may be combined, such that to have a test considered successful, two or more tests must be satisfied. For example, to receive a "pass" indication, a packet may have to pass both the preamble correlation and the HEC. Further, the tests used may change over time depending upon the effectiveness of the tests and the requirements of a particular application or implementation.

III. Channel Classification

According to one embodiment of the invention, a channel is classified based on the channel performance and one or more classification criteria. For example, a channel may be classified as "good" or "bad" based on the results of the channel performance testing by applying one or more performance measurements to specified performance criteria as discussed above. As used herein, a good channel's performance exceeds a specified criterion, or a specified threshold, whereas a bad channel's performance does not exceed the specified threshold. Although this discussion assumes that all available channels, or all channels that could be used by the communications system, are to be tested and classified, particular implementations may test and classify fewer than all of the channels.

According to another embodiment of the invention, multiple tests of each channel are used to classify a channel. For example, a master may test each channel for a specified number of times, such as 10 tests per channel. The use of multiple tests provides a more accurate determination of channel performance because each individual test may be influenced by factors that produce results that do not accurately reflect the overall performance of the channel. For example, an isolated instance of interference may cause a poor channel performance measurement even though the channel generally performs well. Conversely, a channel with heavy interference may have an acceptable channel performance measurement during a temporary break in the interference, even though most of the time there is interference from the interference source, such as another communications system.

For example, Table 1 contains the results of ten channel performance tests for "n" channels. There are three possible results of each hypothetical channel performance test represented in Table 1: high, medium, or low. In practice, each test may have a numerical value, such as an NEB or RSSI value. Also, each numerical test may be represented by a relative value, such as "superior," "average," or "poor", by converting a numerical value to such a qualitative scale (e.g., the RSSI is high indicating good channel performance, the NEB is low indicating good channel performance, etc.). Further, each test may have a simple "pass/fail," "pass/loss", or "pass/RR" for checks such as HEC, CRC, or FEC, and the packet loss ratio (PLR) may be determined by calculating a percentage of packets that are lost, such as by using the preamble correlation, HEC, CRC, or FEC.

TABLE 1

| Channel No. | 1 | 2 | ... | n-1 | n |
|---|---|---|---|---|---|
| Test 1 | Low | Low | ... | High | High |
| Test 2 | Low | Low | ... | High | High |
| Test 3 | High | Low | ... | High | High |
| Test 4 | Low | Low | ... | High | High |
| Test 5 | Low | High | ... | Low | Medium |
| Test 6 | Medium | Low | ... | High | High |
| Test 7 | Low | Low | ... | High | High |
| Test 8 | Low | High | ... | High | High |
| Test 9 | Low | Low | ... | High | High |
| Test 10 | Low | Low | ... | High | High |
| Classification | Bad | Bad | | Good | Good |

In Table 1, channels 1 and 2 are classified as "bad" because the results generally indicate low channel performance even though not all of the individual test results for channels 1 and 2 are low and some are medium or even high. Channels n-1 and n are classified as "good" because the results generally indicate high channel performance even though some individual tests indicated a low or medium result. Although this example uses subjective performance criteria to classify the channels (e.g., that the results are generally low or high), quantitative performance criteria may be used, either in the form of numerical performance measurements or by assigning numerical values to the types of qualitative results depicted in Table 1. In addition, other classification criteria may be used, such as that the highest or lowest performance measurement is to be ignored.

According to another embodiment of the invention, different types of test results may be used and combined. For example, tests that provide NEB results, either numerical or converted to a qualitative scale, may be combined with CRC results of "pass/loss" to arrive at an overall assessment of channel performance. The manner in which such results are combined depends on the particular implementation. For example, different types of tests may be converted to a single type of scale and then combined or averaged to reach a final result, or different test results may be combined using weighting factors that favor some types of tests over others to arrive at a final result.

The conversion of numerical results to qualitative results and the combining of individual tests results to achieve a classification of each channel depends on the how competing tradeoffs are to be weighed for a given implementation. For example, high channel performance may be desired, but setting too high of a standard (e.g., all test results must be "high") may limit the number of channels classified as "good" such that there are few good channels available for use and may result in frequent retesting of the channels when supposedly poor performance is detected. Conversely, setting too low of a standard allows for a larger pool of channels to be used, but then channels with significant interference are classified as good when in fact channel performance is low and channels are not retested when new interference occurs.

According to another embodiment of the invention, the results of the channel performance testing are compared to one or more acceptance criteria. For example, if the testing provides NEB results, an average value may be determined and compared to an acceptance criterion, such as a threshold value. If the testing results exceed the threshold, the channel is classified as "bad", but if the testing results do not exceed the threshold, the channel is classified as "good." As another example, the correlation approach, HEC, and CRC may all be used to determine whether a packet is lost or not (e.g., whether an error occurs as a result of the transmission of the packet) and the packet loss ratio determined and compared to a threshold value. Assuming that a threshold of 15% is established, the loss of more than 15 packets out of 100 would result in the channel being classified as bad, whereas loosing 15 or fewer packets would result in the channel being classified as good.

Channel testing and classification may be performed by a master or other participants, such as slaves. In addition, channel testing and classifications from multiple participants may be combined and/or weighted to determine an overall, or final, classification for the channels of interest.

For example, Table 2 provides an illustration of a "referendum" approach that considers the channel performance determined by a master and seven slaves.

TABLE 2

| Participant | Channel 0 | Channel 22 | ... | Channel n-1 | Channel n |
|---|---|---|---|---|---|
| Master | 0 | 0 | ... | 1 | 1 |
| Slave 1 | 0 | 0 | ... | 1 | 1 |
| Slave 2 | 0 | 0 | ... | 1 | 0 |
| Slave 3 | 0 | 0 | ... | 1 | 1 |
| Slave 4 | 0 | 0 | ... | 1 | 1 |
| Slave 5 | 0 | 1 | ... | 1 | 1 |
| Slave 6 | 0 | 0 | ... | 1 | 1 |
| Slave 7 | 0 | 0 | ... | 1 | 1 |
| Total Votes | 0 | 1 | ... | 8 | 7 |
| Passing Mark | 7 | 7 | ... | 7 | 7 |
| Classification | Bad | Bad | | Good | Good |

In the example depicted in Table 2, each participant has one "vote" on whether to use the channel or not. In the example of Table 2, a vote of "0" means that participant is voting to not use the channel (e.g., the channel is found by that participant to be "bad"), and a vote of "1" means that the participant's vote is to use the channel (e.g., the channel is found by that participant to be "good").

A certain number of votes (e.g., the "passing mark") is required for the channel to be judged "good" and therefore available for use by the FH communications system. In the example of Table 2, the passing mark is seven so that of the eight votes cast for each channel, seven participants must vote to use the channel for it to be classified as "good." The same considerations discussed above for determining how to combine different test results and how to set the threshold for determining whether a channel is bad or good apply here when combining the results of channel performance testing by multiple participants.

While Table 2 indicates that each participant has an equally weighted vote, other referendum approaches may be used. For example, the vote of particular participants, such as the master or a specified slave or slaves, may be given a higher weight. As another example, particular participants may be able to "veto" the result, meaning that those particular participants must vote to use the channel in order for it to receive a passing score.

Other approaches using other classification criteria that differ from that of Table 2 may be used, such as a different manner for counting votes (e.g., using "weighted" votes where some votes count more than others) or determining which participants may vote. Not every participant needs to have input for each channel under consideration. While the referendum may be managed by the master in most cases, other participants may collect and combine the channel performance information, or votes, to determine the final channel classifications.

IV. Communicating Selected Channels to Participants

According to another embodiment of the invention, the set of communications channels is selected based on one or more selection criteria, and data that indicates the selected set of channels is sent to other participants of the communications system. For example, a master may select the channels classified as "good," generate a special packet that identifies the selected set of good communications channels in the payload, and send the special packet to one or more other participants in the communications network. While the master typically performs the selection of the good channels and notifies other participants of the communications system, other participants may perform one or both functions instead of the master.

Figure 4:
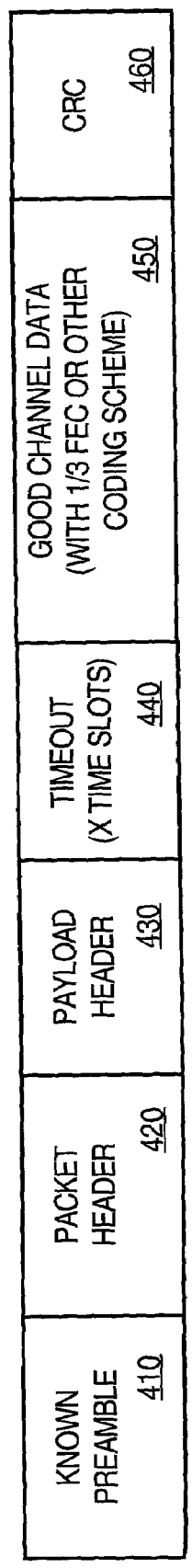
FIG. 4 is a block diagram that depicts a good channel packet sent by a master to slaves to identify a set of selected channels, according to an embodiment of the invention.

According to one embodiment of the invention, the master instructs the other participants when to begin using the selected set of channels. For example, the master may include in the special packet a specified time at which the participants are to begin using the selected channels. Alternatively, the specified time may represent a time delay after which the participants of the communications system begin to use the good channel set instead of the previously used channels. Other time criteria may be used in addition to specifying a time or to specifying a time delay FIG. 4 is a block diagram that depicts a good channel packet 400 sent by a master to slaves to identify a set of selected channels, according to an embodiment of the invention. Although the example depicted in FIG. 4 uses particular types of data in a particular order along with particular error checking and data redundancy approaches, others may be used in place of or in addition to those depicted, and not all of the features depicted in FIG. 4 are necessary for a particular implementation.

Good channel packet 400 includes a known preamble 410, a packet header 420, and a payload header 430, all of which are analogous to the similar elements depicted and discussed with reference to FIGS. 3A, 3B, and 3C above. In addition, good channel packet 400 includes a timeout 440, good channel data 450, and a CRC 460. Good channel data 450 is part of the payload portion of good channel packet 400 and identifies the selected set of good communications channels to be used by the participants of the communications network. Good channel data 450 may be encoded, such as by using a ⅓ FEC coding scheme, to allow the recipient of good channel packet 400 to correct any errors in good channel data 450 that occur as a result of the transmission of good channel packet 400.

CRC 460 is a cyclic redundancy check value for verifying the accurate transmission of good channel packet 400. If the cyclic redundancy check fails, a retransmission request may be sent by the recipient of good channel packet 400 to the sender of good channel packet 400 to have another good channel packet 400 sent.

Timeout 440 specifies a particular time at which the participants are to begin using the new channel, or an amount of time that the participants of the communications system are to wait before beginning to use the good channels identified by good channel data 450. For example, in a Bluetooth or IEEE 802.15.1 FH communications system, timeout 440 specifies the number of time slots to wait before the master and slaves begin to use the good channels. For such FH communications systems, the number of time slots must be at least twice the number of slaves because the master separately communicates good channel packet 400 to each slave at even number time slots and receives an acknowledgement back from each slave on the odd numbered time slots. Other communications systems may use a shorter delay by using a broadcast packet to simultaneously inform the other participants of the communications network of the selected set of communications channels.

According to another embodiment of the invention, additional security protection may be included by sending the good channel information in an encrypted format to the other participants in the communications network. Consider a typical FH communications system in which the FH sequence may be determined if the MAC address of the master is known (because that MAC address is used to select the hopping sequence). By encrypting the good channel data, even if the MAC address is known, the selection by the master of the channels to use and then transmitting those selected channels to other participants in an encoded format precludes other entities from working out the hopping sequence merely by knowing the MAC address. While having the MAC address may provide others with the possible channels that could be used by the particular FH communications network, the other entities cannot determine from the MAC address which channels the master has selected and in which order the master has arranged the selected channels.

According to another embodiment of the invention, some participants of the communications system do not use the selected set of good channels. For example, although typically the selected set of channels is used by all of the participants of the communications system, there may be some participants who are not configured to accept and use a set of communications channels sent by another participant. As a result, in a particular communications system, some participants may communicate with each other using the original or default set of communications channels while other participants communicate using a selected set of good channels.

For example, the master of a FH communications system may track which slaves do and which slaves do not implement the adaptive FH approach described herein. For slaves using the good communications channels, the master and such slaves communicate using that set of good channels, but other slaves that do not use the good channels communicate with the master over the default set of communications channels for the particular FH protocol.

According to yet another embodiment of the invention, more than one set of selected channels is used for communications between different pairings of participants in a communications network. For example, a particular set of selected communications channels may be used between a master and one or more specified slaves while another particular set of selected communications channels is used between the master and one or more other specified slaves. As another example, each pairing of the master and a slave may communicate on a different set of communications channels, such as one of the selected sets of communications channels or the default set of communications channels for the communications system.

V. Implementing Adaptive Frequency Hopping

According to another embodiment of the invention, after a participant has received the set of selected communications channels, the participant stores data that indicates the new set of selected channels. For example, in a Bluetooth or IEEE 802.15.1 FH communications system, each participant has a selection kernel that addresses a register. The output of the kernel is a set of addresses for each slot in the register, while the content of the slot in the register is a channel number. Instead of modifying the selection kernel, which is usually complicated, the register is loaded using only the selected set of communications channels. As a result, when the kernel addresses the register, only the selected set of channels are used.

Because the size of the register is typically based on the standard number of channels for the FH protocol, and the selected set of channels will normally not include some "bad" channels, the number of selected channels is less than the number of slots in the register. One approach for filling up the register is to cyclically load the register using the selected set of communications channels until the register is full. Another approach is to replace "bad" channels in the original or default channel set using good channels that are randomly selected from the selected channel set. For example, if channel 3 is classified as bad but channel 12 is good, then channel 12 is specified in place of channel 3 in the default hopping sequence.

Figure 5A:
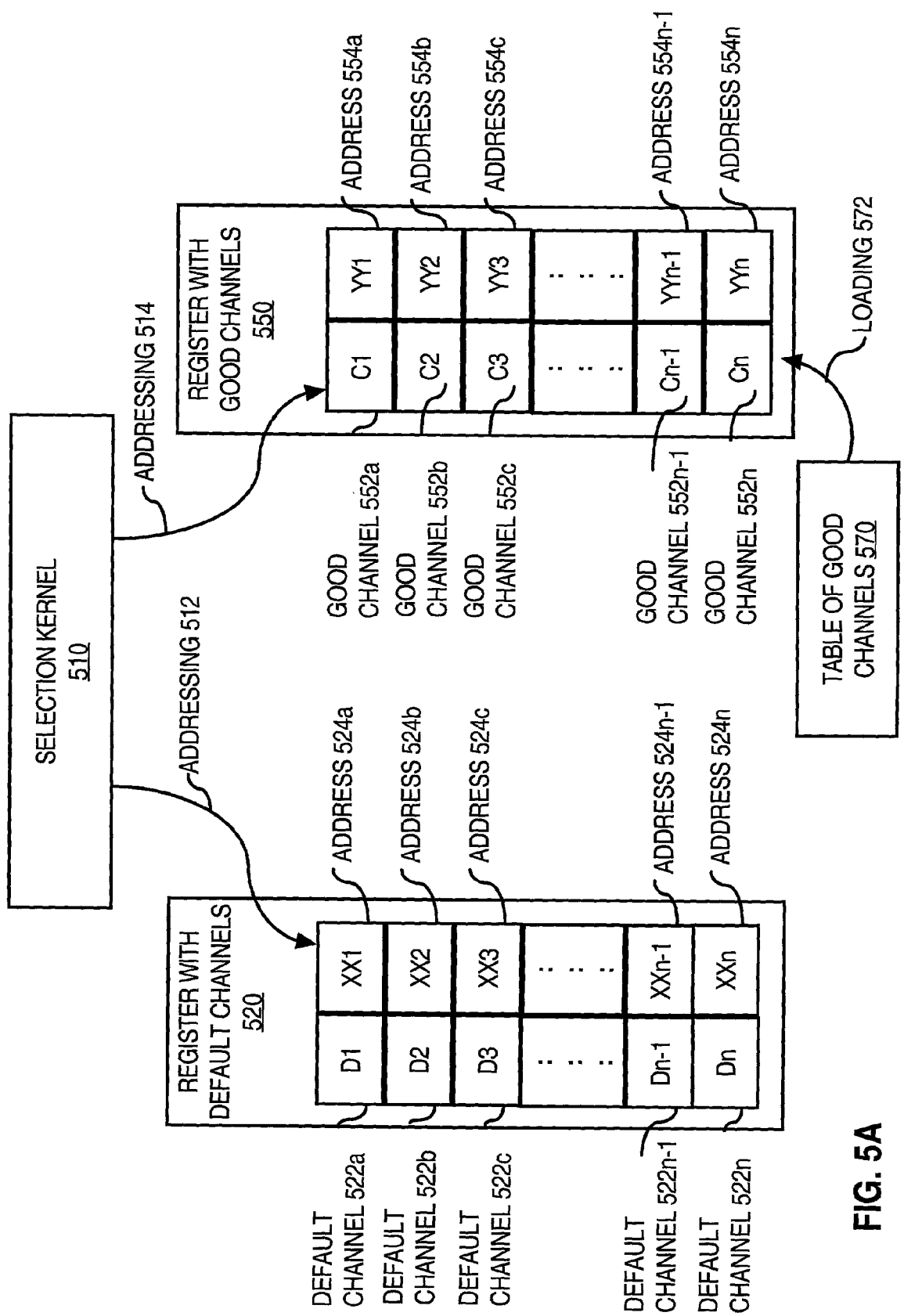
FIG. 5A is a block diagram that depicts the loading of a set of channels into a channel register, according to an embodiment of the invention.

FIG. 5A is a block diagram that depicts the loading of a set of channels into a channel register, according to an embodiment of the invention. FIG. 5A depicts a selection kernel 510, a register with default channels 520, a register with good channels 550, and a table of good channels 570. Register with default channels 520 includes default channels 522a–522n that are the channel numbers for the default set of hopping frequencies for the particular FH protocol being used for the communications network. Register with default channels 520 also includes addresses 524a–524n that are the addresses associated with each slot containing one of default channels 522a–522n, respectively. The addressing by selection kernel 510 of register with default channels 520 is depicted by an addressing arrow 512.

Register with good channels 550 includes default channels 552a–552n that are the channel numbers for the good channels, such as may be provided to the participant using good channel packet 400. The set of selected good channels is depicted in FIG. 5A as table of good channels 570. The loading of the good channels from table of good channels 570 into register with good channels 550 is depicted by a loading arrow 572.

Register with good channels 550 also includes addresses 554a–554n that are the addresses associated with each slot containing one of good channels 552a–552n, respectively. The addressing by selection kernel 510 of register with good channels 550 is depicted by addressing arrow 514. As selection kernel 510 is not modified, an index is applied to the output of selection kernel 510 to address register with good channels 550. When the system switches back to register with default channels 520, the index is removed, and vice versa. Because register with good channels 550 is loaded using the good channels from table of good channels 570, only those good channels are addressed by selection kernel 510.

Figure 5B:
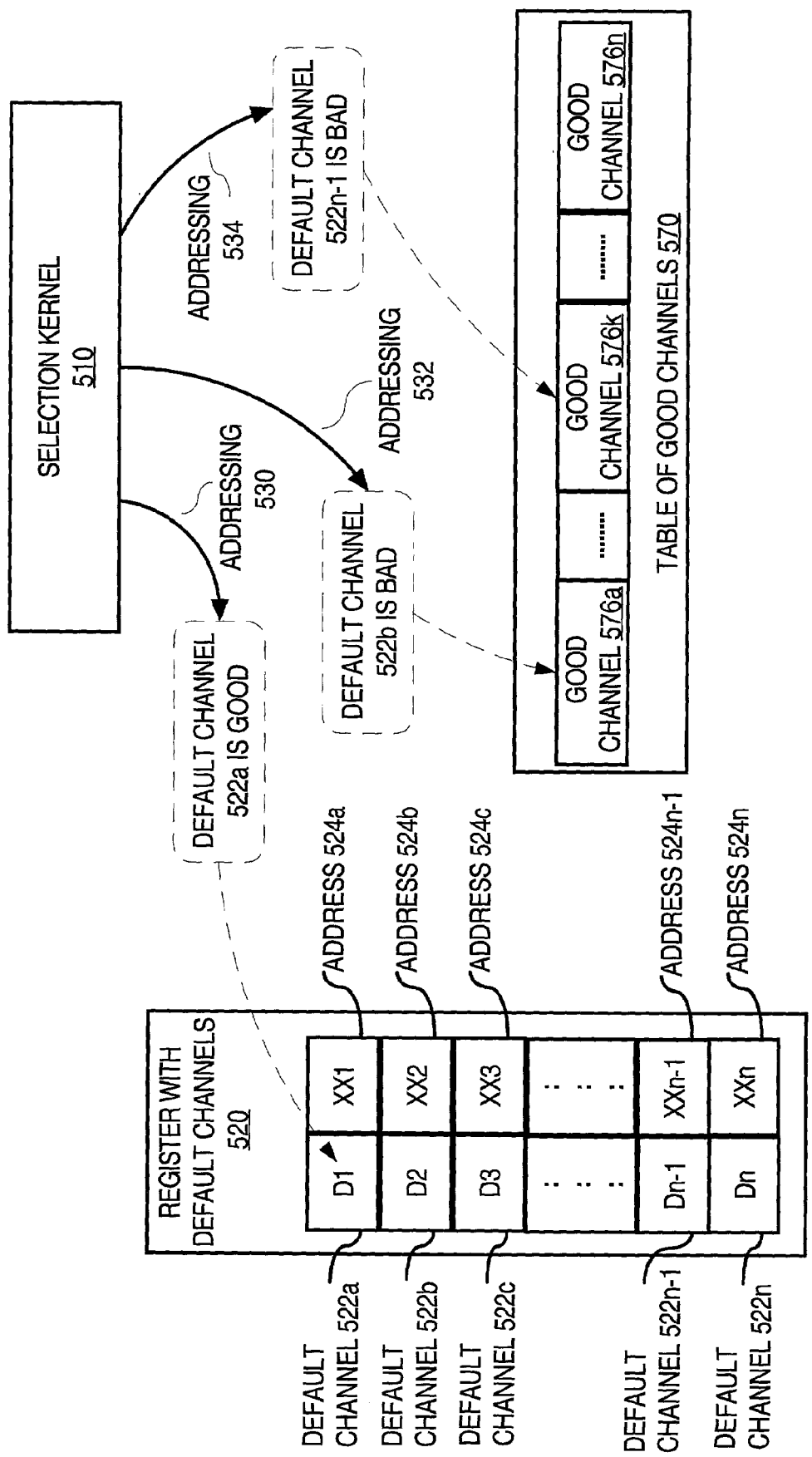
FIG. 5B is a block diagram that depicts the replacement of bad channels with good channels in a default set of channels in a channel register, according to an embodiment of the invention.

FIG. 5B is a block diagram that depicts the replacement of bad channels with good channels in a default set of channels in a channel register, according to an embodiment of the invention. FIG. 5B depicts many of the same features as described above with respect to FIG. 5A, except for the differences discussed herein. The major difference between the example of FIG. 5A and FIG. 5B is that in FIG. 5B, whenever selection kernel 510 addresses a channel classified as bad in register with default channels 520, the bad channel is replaced with a good channel that is randomly selected from table of good channels 570. Thus, only good channels are selected to form the hopping sequence.

In the example of FIG. 5B, register with default channels 520 is the same as in FIG. 5A. However, whenever selection kernel 510 addresses a bad default channel in register with default channels 520, the bad default channel is replaced with good channels that are randomly selected from table of good channels 570. Assume for this example that default channels 522b and 522n-1 are classified as bad and that the remaining default channels are classified as good. Also, for this example, table of good channels 570 includes good channels 576a–576n.

In the particular example of FIG. 5B, addressing arrow 530 depicts selection kernel 510 addressing good default channel 522a, whose address is address 524a. Default channel 522a is used because default channel 522a is classified as good. Although not depicted in FIG. 5B, good default channels 522c and 522n are similarly addressed. However, addressing arrow 532 depicts selection kernel 510 addressing bad default channel 522b, whose address is address 524b. A good channel 576a is randomly selected from good channel table 570 to replace default channel 522b because default channel 522b is classified as bad. As another particular example, addressing arrow 534 depicts selection kernel 510 addressing bad default channel 522n-1, whose address is address 524n-1. A good channel 576k is randomly selected from good channel table 570 to replace bad default channel 522n-1.

As a result of the replacement channel approach described above, all the good channels of the original default set of channels in the original hopping sequence are kept in the same position, while all the bad channels in the original hopping sequence are replaced by good channels. The bad channel replacement approach is dynamic, meaning that the same bad channel can be replaced by another randomly selected good channel when, at a later time, the selection kernel addresses the bad channel.

According to another embodiment of the invention, implementation of a selected set of communications channels includes setting a good channel usage timeout (GCUT). Because interference may change over time, such as from other communications systems starting or stopping to be used or as a result of changes of location of the participants of the communications network or of interference sources, it may be useful to periodically change the set of channels being used. For example, some previously good channels may become bad and vice versa, thus impacting the communications system after the set of communications channels is selected and implemented in the communications network. For a Bluetooth or IEEE 802.15.1 FH communications system, a five-minute GCUT may be used.

According to one embodiment of the invention, after expiration of the GCUT, the participants of the communications network switch back to the original or default set of communications channels, after which additional performance testing may be performed and another set of communications channels selected. The switch back to the default set of communications channels may be performed by each participant at a selected time or after the specified time delay, or the master may send a "switch back" message to the other participants of the communications network with a timeout delay, and then after the timeout delay expires, the participants switch back. In addition, the additional performance testing may be performed prior to expiration of the GCUT to reduce the amount of time the participants use the default set of channels. According to another embodiment of the invention, prior to expiration of the GCUT, the participants are provided with a new set of channels, eliminating the need to switch to the default set of channels.

VI. Monitoring Channels

As discussed above, interference may change over time as a result of other communications systems that become active or inactive or as a result of movement of the participants of a communications system or a source of interference. While the use of the GCUT will eventually allow for such changes to be detected and new channel sets selected that take into account the changes in interference, performance of the communications system prior to the expiration of the GCUT may be impacted to an undesirable degree.

According to one embodiment of the invention, the channel performance of the selected set of communications channels is monitored and rescanning of the default channels is triggered based on specified performance criteria. For example, if a channel previously classified as good is retested and determined to be bad, the communications network may switch back to the default channel set to allow for rescanning of the channels to select a new set of communications channels that account for changes in interference since the previous set was selected. As another example, a channel previously classified as good that is now found to be bad may be replaced by another good channel in the register of the participants. As yet another example, rescanning of the default channels may be triggered when the number of previously good but now bad channels reaches a specified number when the number of still good channels drops below a specified threshold.

While any method of measuring channel performance may be used for monitoring the selected set of communications channels, some methods may be more appropriate than others. For example, the preamble correlation, HEC, CRC, PLR, and FEC approaches discussed above may be used, either alone or in combination with each other, because those approaches do not require the use of special packets. As a result, those approaches may be used during normal data transmissions, thereby providing continuous monitoring of the performance of the selected set of communications channels. A channel that has a specified number of lost packets, such as five, or another threshold of poor channel performance, may be reclassified as bad instead of good.

VII. Message Sequencing and Example Implementation

According to another embodiment of the invention, messages are sent from a master to the slaves of a communications system to switch to and from selected sets of communications channels until a positive acknowledgement is received from the slaves. For example, the master may transmit the selected set of communications channels to all the slaves of the communications network by sending good channel packets and then waiting to receive a positive acknowledgement message from each slave. If a negative acknowledgement is received from a slave, the master retransmits the set of channels to the slave until a positive acknowledgement is received. A negative acknowledgement may include the lack of any message from a slave within a specified period of time or a message indicating an error or other problem with the transmission of the selected set of communications channels. As another example, a similar acknowledgement approach may be used when the master sends a message to the slaves of the communications network to switch back to a default set of communications channels.

Figure 6A:
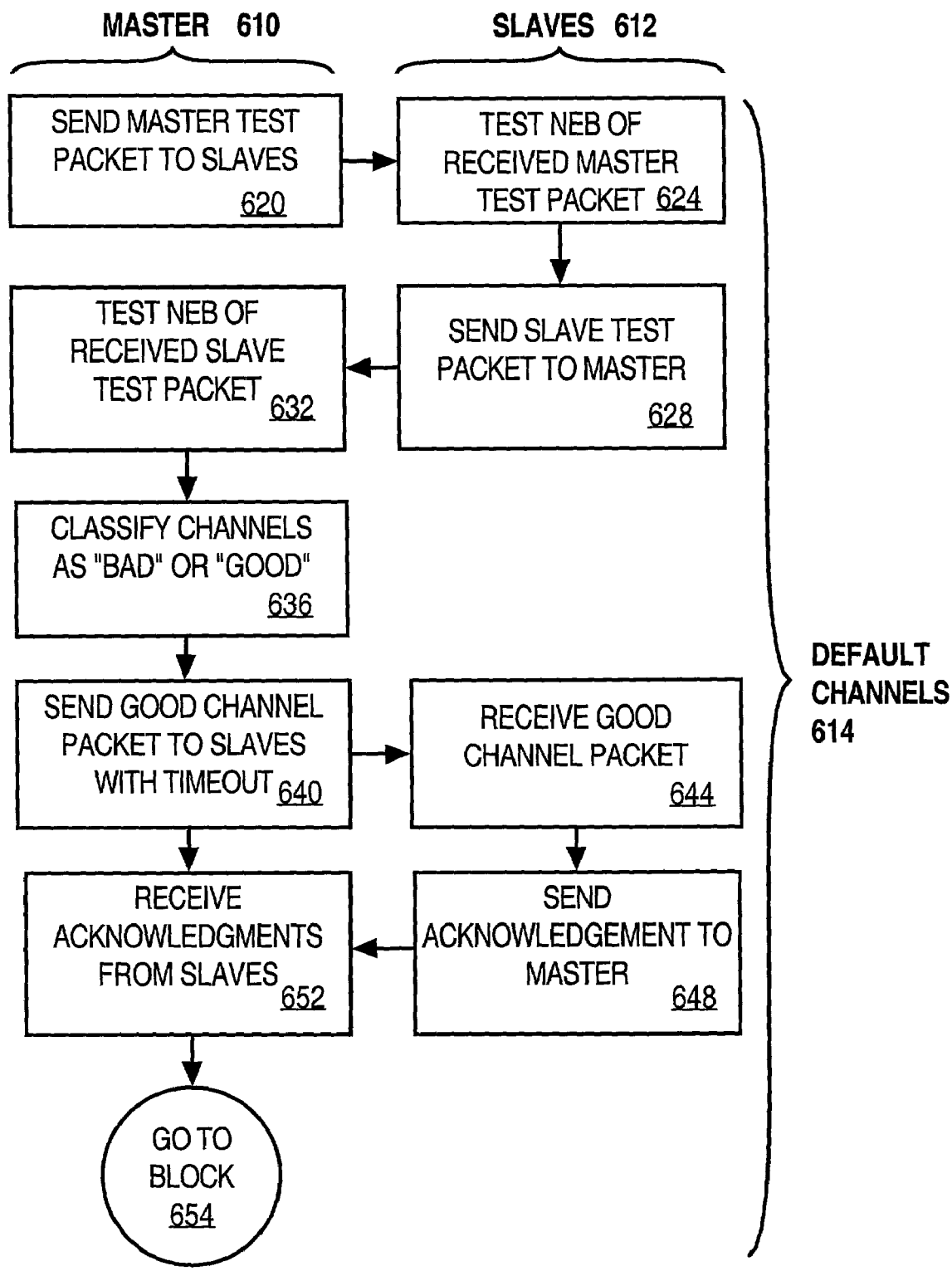
FIGS. 6A, 6B, and 6C are flow diagrams that depict example message sequencing for implementing adaptive frequency hopping, according to an embodiment of the invention.
Figure 6B:
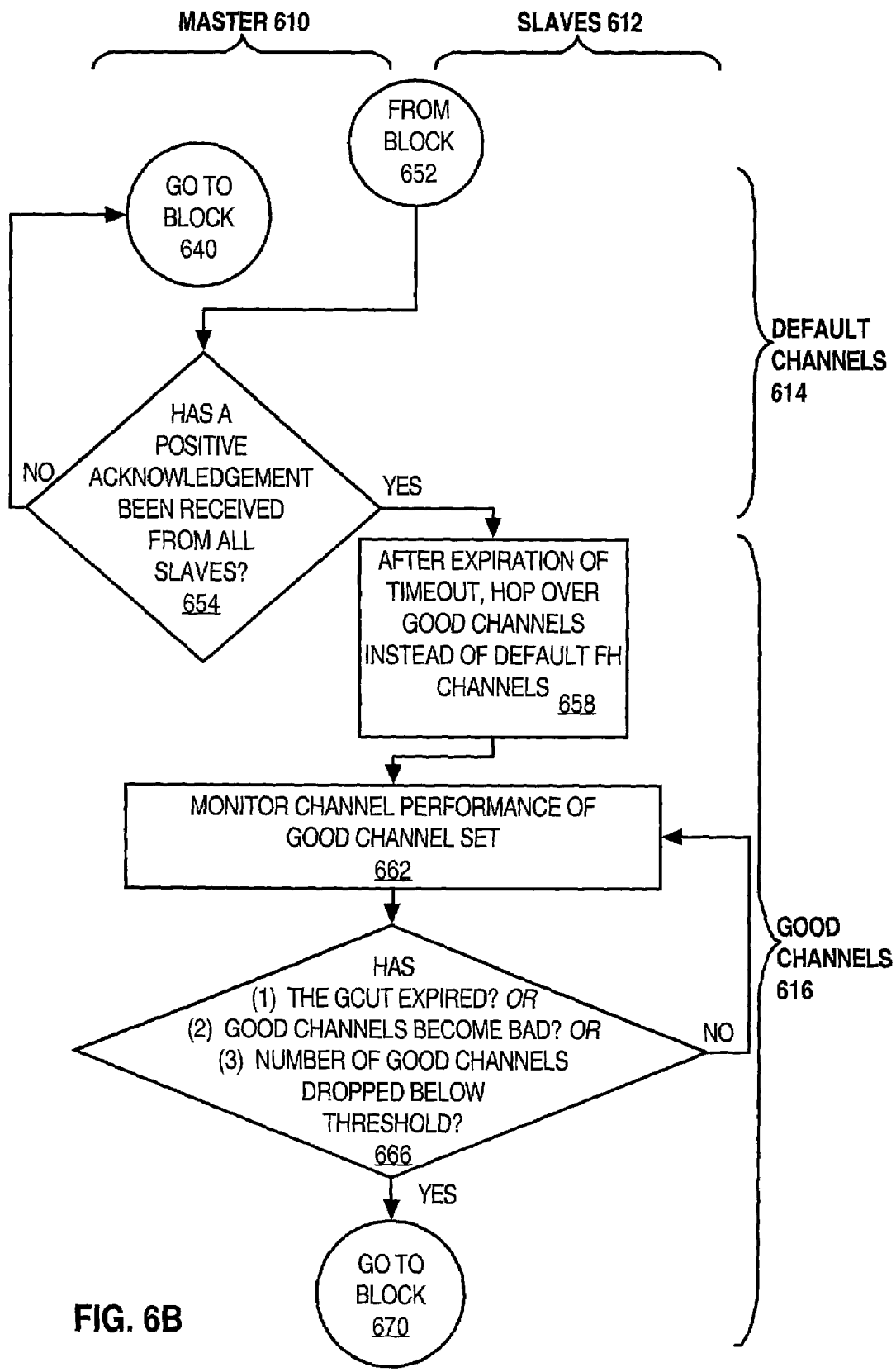
Figure 6C:
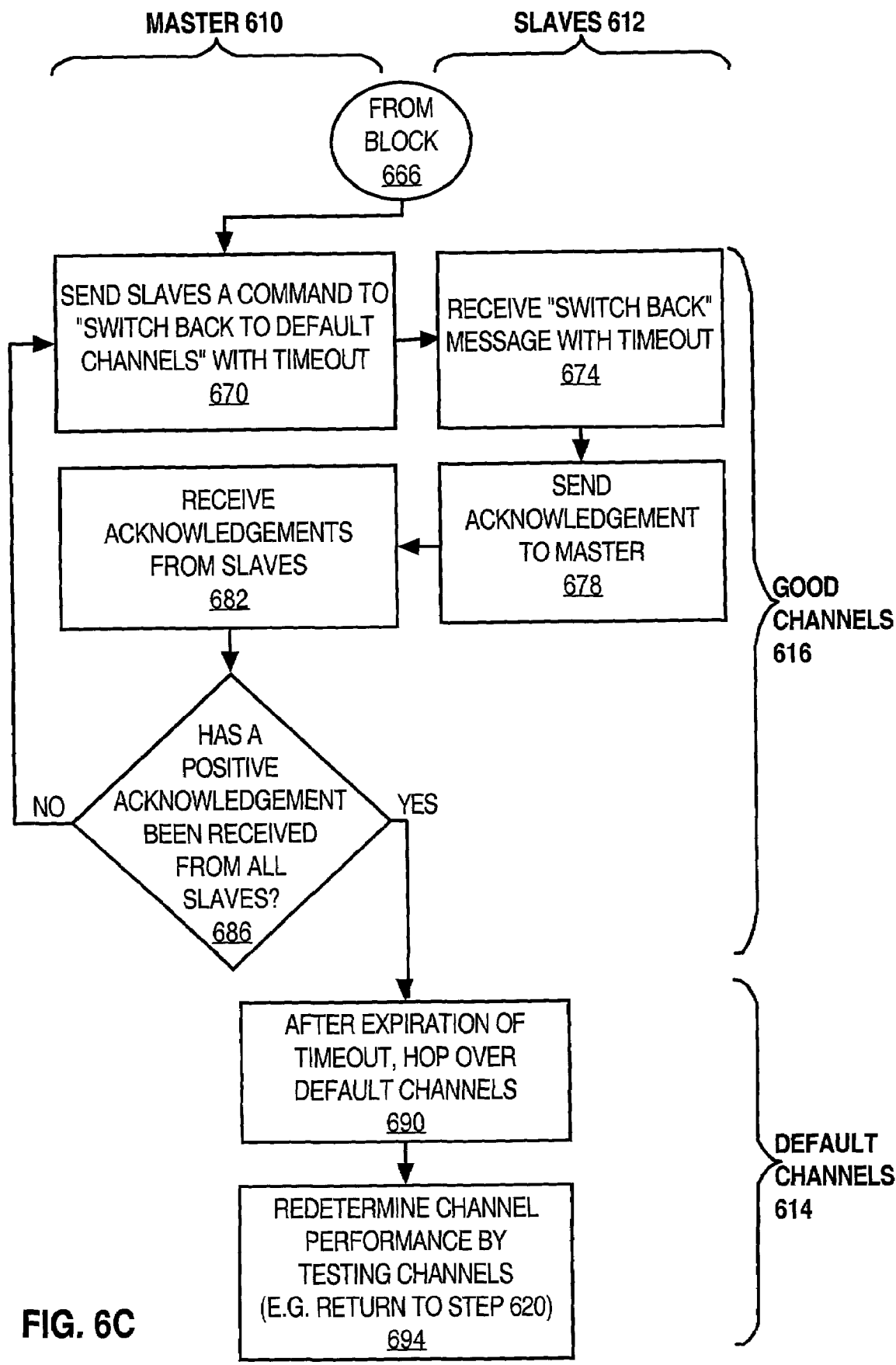

FIGS. 6A, 6B, and 6C are flow diagrams that depict the message sequencing for implementing adaptive frequency hopping, according to an embodiment of the invention. The message sequences depicted are illustrative and particular implementations may include fewer or more steps in the same or a different order or configuration. While steps are indicated as being performed by a master 610, slaves 612, or both, the steps indicated under one type of participant may be performed by other types of participants, and the participant types are not limited to participants that are designated to be either a master or a slave. Also, while the flow diagram depicts the use of either default channels 614 or good channels 616 during the indicated steps, other sets of channels may be used at each step.

In block 620, master 610 sends a master test packet to slaves 612. The master test packet may be that depicted in FIG. 3A if the special packet testing approach is used. In general, any desired channel performance testing method, such as those discussed above, may be used alone or in combination with each other. However, for this example, the use of master test packet 360 and slave test packet 380 will be described. As noted before, the special packet and RSSI testing approaches for determining channel performance are more likely to be used for initial testing of the channels whereas the other testing approaches are more likely to be used for monitoring channel performance of a set of channels.

After master test packet 360 is received, each of slaves 612 test the NEB of master test packet 360 sent by the master to the particular slave over a specified communications channel, as discussed above, to determine the performance of the communications channel, as depicted by block 624.

In block 628, slaves 612 each transmit a slave test packet 380 to master 610. As discussed above, slave test packet 380 includes the NEB of the master test packet (e.g., NEB of last received packet 388 depicted in FIG. 3B).

In block 632, master 610 tests the NEB of slave test packet 380 sent by each of the slaves 612 over another specified communications channel. As discussed before, testing of each channel is typically performed for a specified number of times, such as 10, to get a fair representation of the typical performance of each channel and thereby avoid relying on one or a few tests that may not accurately reflect typical channel performance.

In block 636, master 610 classifies the channels as bad or good based on the testing measurements (e.g., the calculated NEB of the master and slave test packets) by comparing the test results to one or more performance criteria, as discussed above.

In block 640, master 610 sends slaves 612 the good channels, such as by using good channel packet 400 that includes timeout 440 for specifying the delay until the communications network will begin to use the good channels.

Slaves 612 receive good channel packet 400 in block 644. In block 648, slaves 612 send an acknowledgement to master 610 that indicates whether good channel packet 400 was successfully received. Master 610 receives the acknowledgement messages from slaves 612 in block 652.

In block 654, master 610 determines whether a positive acknowledgement has been received from slaves 612. If not, the method returns to block 640 where master 610 sends good channel packet 400 again. If so, the method continues to block 658.

From block 620 through block 654, default channels 614 are used by master 610 and slaves 612 to communicate. However, after expiration of the delay specified by timeout 440 of good channel packet 400, the participants hop over good channels 616 instead of default channels 614, as depicted in block 658.

As noted above, not all participants (e.g., all of slaves 612) may implement the adaptive channel set selection approach described herein, and master 610 may not have received a positive acknowledgement from all the slaves by the time the timeout expires. According to one embodiment of the invention, the master communicates over the good channels with the slaves that are ready to use the good channels and over the default channels with the slaves that are not ready or are unable to use the good channels.

During the use of good channels 616 by the participants of the communications network, the channel performance of the selected set of good channels is monitored, as depicted by block 662, to determine if new or increased interference occurs on the selected set of channels. The monitoring of channel performance may be done by any desired method, including the methods discussed above, either alone or in combination with each other. Typically, the preamble correlation, HEC, CRC, PLR, FEC, or some combination thereof is used since such methods do not require special packets or significant overhead as with the special packet or RSSI approaches.

In block 666, a determination is made whether to switch back from good channels 616 to default channels 614. The determination may be made based on one or more criteria, including but not limited to the following: (1) the expiration of a specified time, such as a GCUT of 5 minutes; (2) classification of at least one previously good channel as now being bad; or (3) the number of channels that remain classified as good drops below a specified threshold (e.g., if the number of good channels of an original good channel set of 50 channels drops below 40). The particular details of each criteria, such as the expiration time or the threshold on the number of good channels, depends on the striking a balance for a particular implementation between the desired performance of the channels and the overhead of reselecting new, good channels.

If in block 666 a determination is made not to switch back to default channels 614, the method returns to block 662 to continue monitoring channel performance. If a determination is made to switch, then the method continues on to block 670.

After master 610 determines that a switch from good channels 616 back to default channels 614 is appropriate, master 610 sends a command to slaves 612 to "switch back to default channels", along with a timeout, as depicted in block 670. For example, master 610 may use a modified version of good channel packet 400 that includes a command to switch back to default channels in the payload portion of the packet instead of good channel data 450. The "switch back" message includes a timeout similar to timeout 440 to specify the delay after which the participants of the communications network switch back to using default channels 614.

Slaves 612 receive the "switch back" message with timeout in block 674, and then in block 678 slaves 612 send an acknowledgement to master 610 that indicates whether the "switch back" message was successfully received. Master 610 receives the acknowledgement messages from slaves 612 in block 682.

In block 686, master 610 determines whether a positive acknowledgement has been received from slaves 612. If not, the method returns to block 670 where master 610 sends the "switch back" message again. If so, the method continues to block 690.

In block 690, after expiration of the delay specified by the timeout included in the "switch back" message, the participants hop over default channels 614 instead of good channels 616.

In block 694, the performance of the default channels is redetermined by additional testing, meaning that the process returns to block 620 to repeat the steps outlined above.

VIII. Implementation Mechanisms

The approach for selecting sets of communications channels based on channel performance described herein may be implemented in a variety of ways and the invention is not limited to any particular implementation. The approach may be integrated into a communications system or a network device, including but not limited to communications devices and communications channel selector apparatuses. Also, the approach may be implemented as a stand-alone mechanism, including but not limited to a communications device and a communications channel selector apparatus, that can operate independently of a communications system. Furthermore, the embodiments, including a communications channel selector mechanism, may be implemented in computer software, hardware, or a combination thereof.

Figure 7:
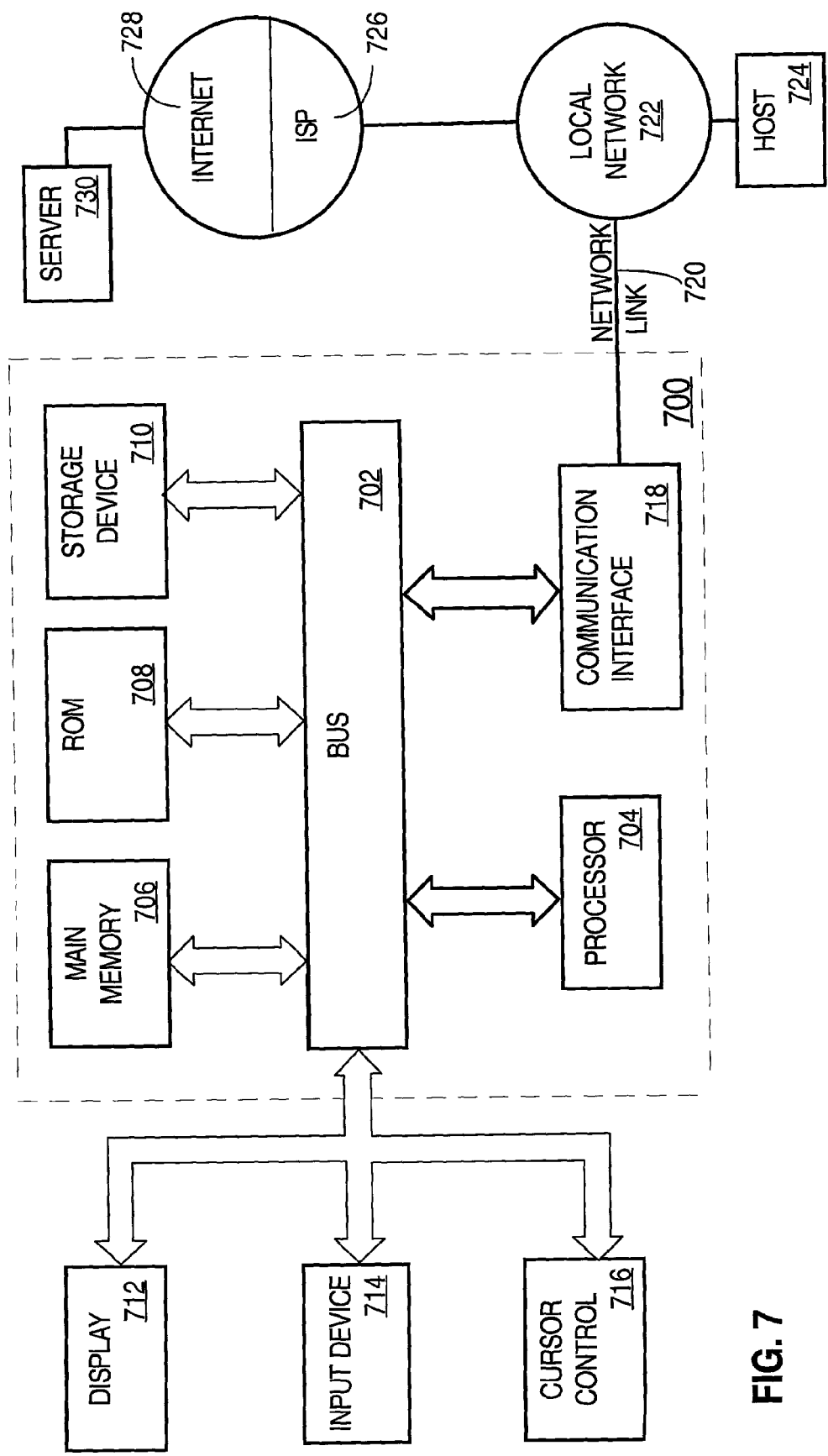
FIG. 7 is a block diagram that depicts a computer system upon which embodiments of the invention may be implemented.

FIG. 7 is a block diagram that depicts a computer system 700 upon which embodiments of the invention may be implemented. Computer system 700 includes a bus 702 or other communications mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments of the invention, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams.

The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments of the invention thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for selecting communications channels for a communications system, the method comprising the computer-implemented steps of:
   selecting, based upon performance of a plurality of communications channels at a first time and channel selection criteria, a first set of two or more communications channels from the plurality of communications channels;
   selecting, based upon performance of the plurality of communications channels at a second time that is later than the first time and the channel selection criteria, a second set of two or more communications channels from the plurality of communications channels;
   wherein the communications system is a frequency hopping communications system and the plurality of communications channels correspond to a set of frequencies to be used based on a hopping sequence according to a frequency hopping protocol; and
   wherein at each hop in the hopping sequence, only one communications channel is used for communications between a pair of participants.

2. The method as recited in claim 1, wherein the channel selection criteria specifies that for a particular communications channel to be selected, the particular communications channel (a) receives a specified number of affirmative votes to use the particular communications channel from a plurality of participants and (b) does not receive a negative vote from a particular participant to not use the particular communications channel.

3. The method as recited in claim 1, wherein the plurality of communications channels communicatively couple at least a plurality of wireless devices.

4. The method as recited in claim 3, wherein the plurality of wireless devices includes one or more mobile devices.

5. The method as recited in claim 1, further comprising the steps of:
   generating first channel identification data that identifies the first set of two or more communications channels;
   transmitting the first channel identification data to one or more participants in the communications system over one communications channel of the plurality of communications channels based on the hopping sequence according to the frequency hopping protocol;

generating second channel identification data that identifies the second set of two or more communications channels; and transmitting the second channel identification data to one or more participants in the communications system over one communications channel of the plurality of communications channels based on the hopping sequence according to the frequency hopping protocol.

6. The method as recited in claim 1, wherein:

the channel selection criteria specifies that for a particular communications channel to be selected, the particular communications channel receives a first specified number of votes to use the particular communications channel from among a plurality of votes;

each participant in a plurality of participants except for a particular participant casts one vote of the plurality of votes; and the particular participant casts a second specified number of votes.

7. The method as recited in claim 1, wherein the channel selection criteria include a channel performance threshold.

8. The method as recited in claim 1, further comprising the steps of:

generating first channel performance data that indicates the performance of the plurality of communications channels at the first time; and generating second channel performance data that indicates the performance of the plurality of communications channels at the second time.

9. The method as recited in claim 1, wherein:

the channel selection criteria specifies that for a particular communications channel to be selected, the particular communications channel receives a specified number of votes to use the particular communications channel from among a plurality of votes; and each participant in a plurality of participants casts one vote of the plurality of votes.

10. The method as recited in claim 1, further comprising the steps of:

communicating, prior to the second time, over the first set of two or more communications channels, according to the frequency hopping protocol; and communicating, after a third time that is not earlier than the second time, over the second set of two or more communications channels, according to the frequency hopping protocol.

11. The method as recited in claim 1, further comprising the steps of:

determining the performance of the plurality of communications channels at the first time; and determining the performance of the plurality of communications channels at the second time.

12. The method as recited in claim 1, wherein the performance of the plurality of communications channels is based on channel performance data that is transmitted over one or more of the plurality of communications channels based on the hopping sequence according to the frequency hopping protocol.

13. The method as recited in claim 12, wherein the performance of the plurality of communications channels is based on additional channel performance data that is based on transmitting the channel performance data over one or more of the plurality of communications channels based on the hopping sequence according to the frequency hopping protocol.

14. A method for selecting communications channels for a frequency hopping communications system, the method comprising the computer-implemented steps of:

selecting, based upon performance of a plurality of communications channels at a first time and channel selection criteria, a first set of two or more communications channels from the plurality of communications channels, wherein the plurality of communications channels correspond to a set of frequencies to be used based on a hopping sequence according to a frequency hopping protocol, and wherein at each hop in the hopping sequence, only one communications channel is used for communications between a pair of participants;

determining, based upon performance of the first set of two or more communications channels at a second time that is later than the first time, a number of communications channels from the first set of two or more communications channels that satisfy the channel selection criteria; and if the number of communications channels from the first set of two or more communications channels that satisfy the channel selection criteria at the second time is less than a specified number, then selecting, based upon performance of the plurality of communications channels at a third time that is later than the second time and the channel selection criteria, a second set of two or more communications channels from the plurality of communications channels in the frequency hopping communications system.

15. A method for communicating with a participant in a communications arrangement, the method comprising the computer-implemented steps of:

selecting, based on first performance data that indicates performance of a plurality of communications channels at a first time and at least a first performance criterion, a first set of two or more communications channels from the plurality of communications channels;

generating first identification data that identifies the first set of two or more communications channels;

providing the first identification data to the participant;

communicating with the participant over the first set of two or more communications channels, wherein the plurality of communications channels correspond to a set of frequencies to be used based on a hopping sequence according to a frequency hopping protocol;

wherein at each hop in the hopping sequence, only one communications channel is used for communications between a pair of participants; and wherein the first identification data is provided to the participant over one communications channel of the plurality of communications channels based on the hopping sequence according to the frequency hopping protocol.

16. The method of claim 15, wherein the participant is selected from the group consisting of a wireless device and a mobile device.

17. The method of claim 15, wherein the first performance data indicates performance for each communications channel of the plurality of communications channels.

18. The method of claim 15, wherein the step of providing the first identification data to the participant comprises the computer-implemented steps of:

encrypting the first identification data; and providing the encrypted first identification data to the participant.

19. The method of claim 15, further comprising the computer-implemented steps of:
    selecting, based on second performance data that indicates performance of the plurality of communications channels at a second time that is different than the first time and at least a second performance criterion, a second set of two or more communications channels from the plurality of communications channels;
    generating second identification data that identifies the second set of two or more communications channels;
    providing the second identification data to the participant over one communications channel of the plurality of communications channels based on the hopping sequence according to the frequency hopping protocol; and
    communicating with the participant over the second set of two or more communications channels, according to the frequency hopping protocol.

20. The method as recited in claim 15, further comprising the computer-implemented step of:
    after selecting the first set of two or more communications channels, causing the first set of two or more communications channels to be loaded into a register of the participant.

21. The method of claim 19, wherein the participant is a first participant, and wherein the method further comprises the computer-implemented steps of:
    providing the first identification data to a second participant over one communications channel of the plurality of communications channels based on the hopping sequence according to the frequency hopping protocol; and
    communicating with the second participant over the first set of two or more communications channels while communicating with the first participant over the second set of two or more communications channels.

22. The method of claim 19, wherein:
    the second set of two or more communications channels is different than the first set of two or more communications channels; and
    the first performance criterion is different than the second performance criterion.

23. The method as recited in claim 15, wherein the participant is a first participant, wherein a default set of two or more communications channels is associated with the hopping sequence and is not changed based on the performance of the plurality of communications channels, and the method further comprises the computer-implemented steps of:
    communicating with a second participant over the default set of two or more communications channels while communicating with the first participant over the first set of two or more communications channels.

24. The method of claim 15, wherein the step of selecting the first set of two or more communications channels comprises the computer-implemented steps of:
    classifying the performance of at least one communications channel of the plurality of communications channels based on the first performance data and one or more classification criteria that includes at least the first performance criterion; and
    selecting the first set of two or more communications channels based on the at least one classified communications channel and one or more selection criteria.

25. The method of claim 15, further comprising the computer-implemented steps of:
    after expiration of a specified amount of time,
    selecting, based on second performance data that indicates performance of the plurality of communications channels and at least a second performance criterion, a second set of two or more communications channels from the plurality of communications channels;
    generating second identification data that identifies the second set of two or more communications channels;
    providing the second identification data to the participant over one communications channel of the plurality of communications channels based on the hopping sequence according to the frequency hopping protocol; and
    communicating with the participant over the second set of two or more communications channels.

26. The method of claim 15, further comprising the computer-implemented steps of:
    determining, based on second performance data that indicates performance of the first set of two or more communications channels at a second time that is later than the first time, a number of communications channels from the first set of two or more communications channels that satisfy at least a second performance criterion;
    if the number of communications channels from the first set of two or more communications channels is less than a specified number, then:
    selecting, based on third performance data that indicates performance of the plurality of communications channels at a third time that is at or later than the second time and at least a third performance criterion, a second set of two or more communications channels from the plurality of communications channels;
    generating second identification data that identifies the second set of two or more communications channels;
    providing the second identification data to the participant over one communications channel of the plurality of communications channels based on the hopping sequence according to the frequency hopping protocol; and
    communicating with the participant over the second set of two or more communications channels.

27. The method of claim 15, further comprising the computer-implemented step of:
    if performance data for at least one communications channel of the first set of two or more communications channels satisfies at least a second performance criterion, then
    selecting, based on second performance data that indicates performance of the plurality of communications channels at a different time and at least a third performance criterion, a second set of two or more communications channels from the plurality of communications channels;
    generating second identification data that identifies the second set of two or more communications channels;
    providing the second identification data to the participant over one communications channel of the plurality of communications channels based on the hopping sequence according to the frequency hopping protocol; and
    communicating with the participant over the second set of two or more communications channels.

28. The method of claim 15, wherein the first performance data for the plurality of communications channels is determined by the computer-implemented steps of:
 transmitting first data to the participant over at least one communications channel of the plurality of communications channels;
 receiving, from the participant, second data that indicates a measurement of performance of the at least one communications channel, wherein the measurement is based on transmitting the first data over the at least one communications channel; and
 determining the first performance data based on at least the second data.

29. The method of claim 15, wherein the first performance data for the plurality of communications channels is determined by the computer-implemented steps of:
 transmitting first data to the participant over at least one communications channel of the plurality of communications channels;
 receiving, from the participant over at least one additional communications channel of the plurality of communications channels, second data that indicates a measurement of performance of the at least one communications channel based on transmitting the first data over the at least one communications channel;
 generating an additional measurement of performance of the at least one additional communications channel based on receiving the second data over the at least one additional communications channel; and
 determining the first performance data based on at least the second data and the additional measurement.

30. The method of claim 15, wherein the first performance data for the plurality of communications channels is determined by the computer-implemented steps of:
 transmitting first data to the participant over at least one communications channel of the plurality of communications channels, wherein the first data includes one or more copies of a specified data string;
 receiving, from the participant, second data that indicates a measurement of performance of the at least one communications channel based on whether errors occur in the one or more copies of the specified data string of the first data as a result of transmitting the first data to the participant over the at least one communications channel; and
 determining the first performance data based on at least the second data.

31. The method of claim 30, wherein the first data is a data packet and wherein the one or more copies of the specified data string are included in a portion of the data packet selected from the group consisting of a payload portion of the data packet and a preamble portion of the data packet.

32. The method of claim 15, wherein:
 the participant is designated to be a slave; and
 a master performs the steps of selecting, generating, providing, and communicating.

33. The method of claim 15, wherein the first performance data for the plurality of communications channels is based on a channel performance testing technique selected from the group consisting of a received signal strength indicator, a header error check, a cyclic redundancy check, a packet loss ratio, a number of error bits, and forward error correction.

34. The method of claim 15, wherein the first performance data for the plurality of communications channels is determined by the computer-implemented steps of:
 performing a specified number of communications channel performance tests on each communication channel in the plurality of communications channels; and
 determining the first performance data based on results of the specified number of communications channel performance tests.

35. The method of claim 15, wherein the first performance data for the plurality of communications channels is determined by the computer-implemented steps of:
 performing a specified number of communications channel performance tests on each communication channel in the plurality of communications channels;
 receiving channel performance data from the participant;
 determining the first performance data based on results of the specified number of communications channel performance tests and the channel performance data from the participant.

36. The method of claim 15, wherein the participant is a first participant, and wherein the method further comprises the computer-implemented steps of:
 providing the first identification data to a second participant over one communications channel of the plurality of communications channels based on the hopping sequence according to the frequency hopping protocol; and
 communicating with the second participant over the first set of two or more communications channels.

37. The method of claim 15, wherein the participant is a first participant, and wherein the method further comprises the computer-implemented steps of:
 communicating with a second participant over the plurality of communications channels.

38. The method of claim 15, wherein the step of communicating with the participant over the first set of two or more communications channels includes communicating with the participant over the over the first set of two or more communications channels according to a frequency hopping protocol defined by Institute of Electrical and Electronics Engineers 802.15.1 Wireless Personal Area Network Standard.

39. The method of claim 15, wherein the step of communicating with the participant over the first set of two or more communications channels includes communicating with the participant over the first set of two or more communications channels according to a frequency hopping protocol that conforms to a Bluetooth communications standard for transmissions over a 2.4 GHz band.

40. The method of claim 15, wherein the step of selecting the first set of two or more communications channels comprises the computer-implemented steps of:
 classifying, based on the first performance data and at least the first performance criterion, at least two communications channels of the plurality of communications channels as good or bad; and
 selecting at least two communications channels of the plurality of communications channels that are classified as good.

41. A method for communicating among a network of communications devices according to a frequency hopping protocol, the method comprising the computer-implemented steps of:
 determining first performance data for a plurality of communications channels based on one or more performance measurements of the plurality of communications channels, wherein the plurality of communications channels correspond to a set of frequencies to be used based on a hopping sequence according to the frequency hopping protocol, and wherein at each hop in the hopping sequence, only one communications channel is used for communications between a pair of communications devices;

determining classifications, based on the first performance data and at least a first performance criterion, of at least two communications channels of the plurality of communications channels;

selecting, based upon the classifications of the at least two communications channels, a first set of two or more communications channels;

generating first identification data that identifies the first set of two or more communications channels;

providing the first identification data to a communications device of the network of communications devices over one communications channel of the plurality of communications channels based on the hopping sequence according to the frequency hopping protocol;

communicating with the communications device over the first set of two or more communications channels according to the frequency hopping protocol;

determining performance data for the first set of two or more communications channels; and if the performance data indicates that at least a specified number of communications channels of the first set of two or more communications channels do not satisfy specified performance criteria, then determining second performance data for the plurality of communications channels based on one or more additional performance measurements of the plurality of communications channels;

determining additional classifications, based on the second performance data and at least a second performance criterion, of at least two communications channels of the plurality of communications channels;

selecting, based upon the additional classifications of the at least two communications channels, a second set of two or more communications channels from the plurality of communications channels;

generating second identification data that identifies the second set of two or more communications channels;

providing the second identification data to the communications device of the network of communications devices over one communications channel of the plurality of communications channels based on the hopping sequence according to the frequency hopping protocol; and communicating with the communications device over the second set of two or more communications channels according to the frequency hopping protocol.

42. The method of claim 41, wherein the classifications include good and bad, and wherein the step of selecting the first set of two or more communications channels includes selecting the first set of two or more communications channels from communications channels that are determined to have classifications of good, and wherein the step of selecting the second set of two or more communications channels includes selecting the second set of two or more communications channels from communications channels that are determined to have classifications of good.

43. A communications device for use in a network of devices, comprising:

a memory containing identification data that identifies a first set of two or more communications channels from a plurality of communications channels, wherein channel performance of the first set of two or more communications channels and at least one performance criterion are used to select the first set of two or more communications channels;

a transceiver that is communicatively coupled to the memory and that is configured to transmit and receive, based on the identification data, over the first set of two or more communications channels, according to a frequency hopping protocol;

wherein the plurality of communications channels correspond to a set of frequencies to be used based on a hopping sequence according to the frequency hopping protocol; and wherein at each hop in the hopping sequence, only one communications channel is used for communications between a pair of participants.

44. The communications device of claim 43, wherein the frequency hopping protocol conforms to a Bluetooth communications standard for transmissions over a 2.4 GHz band.

45. The communications device of claim 43, wherein the transceiver receives a transmission of first data from another device, and wherein the communications device further comprises:

a processor that is communicatively coupled to the memory, wherein the memory includes one or more sequences of instructions which, when executed by the processor, cause the processor to:

generate a measurement of channel performance based on the transmission of the first data;

wherein the transceiver transmits, to another communications device, second data that includes performance data that indicates the measurement of channel performance; and wherein the first set of two or more communications channels is selected based at least in part on the measurement of channel performance.

46. The communications device of claim 43, wherein the transceiver receives a transmission of first data from another device, wherein the first data includes one or more copies of a specified data string, and wherein the communications device further comprises:

a processor that is communicatively coupled to the memory, wherein the memory includes one or more sequences of instructions which, when executed by the processor, cause the processor to:

generate a measurement of channel performance based on whether errors occur in the one or more copies of the specified data string of the first data as a result of the transmission of the first data;

wherein the transceiver transmits second data, to another communications device, that includes performance data that indicates the measurement of channel performance; and wherein the first set of two or more communications channels is selected based at least in part on the measurement of channel performance.

47. The communications device of claim 43, wherein:
the communications device is designated to be a slave.

48. The communications device of claim 43, wherein:
the communications device is selected from the group consisting of a wireless communications device and a mobile communications device.

49. The communications device of claim 43, wherein the frequency hopping protocol is defined by Institute of Electrical and Electronics Engineers 802.15.1 Wireless Personal Area Network Standard.

50. A communications device for use in a network of devices, comprising:
- a memory for storing one or more sequences of instructions;
- a processor that is communicatively coupled to the memory, wherein the memory includes one or more sequences of instructions which, when executed by the processor, cause the processor to:
  - select, based on first performance data that indicates performance of a plurality of communications channels at a first time and at least a first performance criterion, a first set of two or more communications channels from the plurality of communications channels;
  - generate and store in the memory first identification data that identifies the first set of two or more communications channels;
  - cause the first identification data to be transmitted to another communications device;
- a transceiver that is communicatively coupled to the memory and that is configured to transmit to and receive from the other communications device, based on the first identification data, over the first set of two or more communications channels, according to a frequency hopping protocol, wherein the plurality of communications channels correspond to a set of frequencies to be used based on a hopping sequence according to a frequency hopping protocol;
- wherein at each hop in the hopping sequence, only one communications channel is used for communications between a pair of participants; and
- the first identification data is transmitted to the other communications device over one communications channel of the plurality of communications channels based on the hopping sequence according to the frequency hopping protocol.

51. The communications device of claim 50, wherein:
- the communications device is designated to be a first mobile device; and
- the other communications device is designated to be a second mobile device.

52. The communications device of claim 50, wherein:
- the communications device is designated to be a first wireless device; and
- the other communications device is designated to be a second wireless device.

53. The communications device of claim 50, wherein:
- the communications device is designated to be a master; and
- the other communications device is designated to be a slave.

54. The communications device of claim 50, wherein the first performance data indicates performance for each communications channel of the plurality of communications channels.

55. The communications device of claim 50, wherein the memory includes one or more additional sequences of instructions which, when executed by the processor, cause the processor to:
- encrypt the first identification data; and
- cause the encrypted first identification data to be transmitted to the other communications device.

56. The communications device of claim 50, wherein the memory includes one or more additional sequences of instructions which, when executed by the processor, cause the processor to:
- select, based on second performance data that indicates performance of the plurality of communications channels at a second time that is different than the first time and at least a second performance criterion, a second set of two or more communications channels from the plurality of communications channels;
- generate and store in the memory second identification data that identifies the second set of two or more communications channels;
- cause the second identification data to be transmitted to the other communications device over one communications channel of the plurality of communications channels based on the hopping sequence according to the frequency hopping protocol; and
- wherein the transceiver is configured to transmit to and receive from the other communications device, based on the second identification data, over the second set of two or more communications channels.

57. The communications device of claim 56, wherein the other communications device is a first communications device, and wherein the memory includes one or more additional sequences of instructions which, when executed by the processor, cause the processor to:
- cause the first identification data to be transmitted to a second communications device over one communications channel of the plurality of communications channels based on the hopping sequence according to the frequency hopping protocol; and
- wherein the transceiver communicates with the second communications device over the first set of two or more communications channels while communicating with the first communications device over the second set of two or more communications channels.

58. The communications device of claim 56, wherein:
- the second set of two or more communications channels is different than the first set of two or more communications channels; and
- the first performance criterion is different than the second performance criterion.

59. The communications device of claim 50, wherein the one or more sequences of instructions that cause the processor to select the first set of two or more communications channels comprises one or more additional sequences of instructions which, when executed by the processor, cause the processor to:
- classify, based on the first performance data and at least the first performance criterion, at least two communications channels of the plurality of communications channels are good or bad; and
- select at least two communications channels of the plurality of communications channels that are classified as good.

60. The communications device of claim 50, wherein the one or more sequences of instructions that cause the processor to select the first set of two or more communications channels comprises one or more additional sequences of instructions which, when executed by the processor, cause the processor to:
- classify the performance of at least one communications channel of the plurality of communications channels based on the first performance data and one or more classification criteria that includes at least the first performance criterion; and
- select the first set of two or more communications channels based on the at least one classified communications channel and one or more selection criteria.

61. The communications device of claim 50, wherein the memory includes one or more additional sequences of instructions which, when executed by the processor, cause the processor to:

after expiration of a specified amount of time,
select, based on second performance data that indicates performance of the plurality of communications channels and at least a second performance criterion, a second set of two or more communications channels from the plurality of communications channels;
generate and store in the memory second identification data that identifies the second set of two or more communications channels;
cause the second identification data to be transmitted to the other communications device over one communications channel of the plurality of communications channels based on the hopping sequence according to the frequency hopping protocol; and
wherein the transceiver is configured to transmit to and receive from the other communications device, based on the second identification data, over the second set of two or more communications channels.

62. The communications device of claim 50, wherein the memory includes one or more additional sequences of instructions which, when executed by the processor, cause the processor to:

determine, based on second performance data that indicates performance of the first set of two or more communications channels at a second time that is later than the first time, a number of communications channels from the first set of two or more communications channels that satisfy at least a second performance criterion;
if the number of communications channels from the first set of two or more communications channels is less than a specified number, then:
select, based on third performance data that indicates performance of the plurality of communications channels at a third time that is at or later than the second time and at least a third performance criterion, a second set of two or more communications channels from the plurality of communications channels;
generate second identification data that identifies the second set of two or more communications channels; and
cause the second identification data to be transmitted to the other communications device over one communications channel of the plurality of communications channels based on the hopping sequence according to the frequency hopping protocol; and
wherein the transceiver is configured to transmit to and receive from the other communications device, based on the second identification data, over the second set of two or more communications channels.

63. The communications device of claim 50, wherein the memory includes one or more additional sequences of instructions which, when executed by the processor, cause the processor to:

if performance data for at least one communications channel of the first set of two or more communications channels satisfies at least a second performance criterion, then:
select, based on second performance data that indicates performance of the plurality of communications channels at a different time and at least a third performance criterion, a second set of two or more communications channels from the plurality of communications channels;
generate and store in the memory second identification data that identifies the second set of two or more communications channels;
cause the second identification data to be transmitted to the other communications device over one communications channel of the plurality of communications channels based on the hopping sequence according to the frequency hopping protocol; and
wherein the transceiver is configured to transmit to and receive from the other communications device, based on the second identification data, over the second set of two or more communications channels.

64. The communications device of claim 50, wherein the transceiver is configured to:

transmit first data to the other communications device over at least one communications channel of the plurality of communications channels;
receive, from the other communications device, second data that indicates a measurement of performance of the at least one communications channel based on transmitting the first data over the at least one communications channel; and
wherein the memory includes one or more additional sequences of instructions which, when executed by the processor, cause the processor to:
determine the first performance data based on at least the second data.

65. The communications device of claim 50, wherein the transceiver is configured to:

transmit first data to the other communications device over at least one communications channel of the plurality of communications channels;
receive from the other communications device over at least one additional communications channel of the plurality of communications channels, second data that indicates a measurement of performance of the at least one communications channel based on transmitting the first data over the at least one communications channel; and
wherein the memory includes one or more additional sequences of instructions which, when executed by the processor, cause the processor to:
generate an additional measurement of performance of the at least one additional communications channel based on receiving the second data over the at least one additional communications channel; and
determine the first performance data based on at least the second data and the additional measurement.

66. The communications device of claim 50, wherein the transceiver is configured to:

transmit first data to the other communications device over at least one communications channel of the plurality of communications channels,
wherein the first data includes one or more copies of a specified data string;
receive, from the other communications device, second data that indicates a measurement of performance of the at least one communications channel based on whether errors occur in the one or more copies of the specified data string of the first data as a result of transmitting the first data to the other communications device over the at least one communications channel; and wherein the memory includes one or more additional sequences of instructions which, when executed by the processor, cause the processor to:
determine the first performance data based on at least the second data.

67. The communications device of claim 66, wherein:
the first data is a data packet; and
the one or more copies of the specified data string are included in a portion of the data packet selected from the group consisting of a payload portion of the data packet and a preamble portion of the data packet.

68. The communications device of claim 50, wherein the transceiver is configured to transmit and receive over the first set of two or more communications channels according to a frequency hopping protocol that conforms to a Bluetooth communications standard for transmissions over a 2.4 GHz band.

69. The communications device of claim 50, wherein the first performance data for the plurality of communications channels is based on a channel performance testing technique selected from the group consisting of a received signal strength indicator, a header error check, a cyclic redundancy check, a packet loss ratio, a number of error bits, and forward error correction.

70. The communications device of claim 50, wherein the first performance data for the plurality of communications channels is determined by one or more additional sequences of instructions which, when executed by the processor, cause the processor to:
perform a specified number of communications channel performance tests on each communication channel in the plurality of communications channels; and
determine the first performance data based on results of the specified number of communications channel performance tests.

71. The communications device of claim 50, wherein the first performance data for the plurality of communications channels is determined by one or more additional sequences of instructions which, when executed by the processor, cause the processor to:
perform a specified number of channel performance tests on each communication channel in the plurality of communications channels;
receive channel performance data from the other communications device;
determine the first performance data based on results of the specified number of communications channel performance tests and the channel performance data from the other communications device.

72. The communications device of claim 50, wherein the transceiver is configured to:
transmit the first identification data to a third communications device over one communications channel of the plurality of communications channels based on the hopping sequence according to the frequency hopping protocol; and
transmit to and receive from the third communications device, based on the first identification data, over the first set of two or more communications channels.

73. The communications device of claim 50, wherein the transceiver is configured to:
transmit to and receive from a third communications device over the plurality of communications channels.

74. The communications device of claim 50, wherein the transceiver is configured to transmit and receive over the first set of two or more communications channels according to a frequency hopping protocol defined by Institute of Electrical and Electronics Engineers 802.15.1 Wireless Personal Area Network Standard.

75. A communications channel selector apparatus comprising:
means for selecting, based upon performance of a plurality of communications channels at a first time and channel selection criteria, a first set of two or more communications channels from the plurality of communications channels;
means for selecting, based upon the performance of the plurality of communications channels at a second time that is later than the first time and the channel selection criteria, a second set of two or more communications channels from the plurality of communications channels;
wherein the plurality of communications channels correspond to a set of frequencies to be used based on a hopping sequence according to a frequency hopping protocol; and
wherein at each hop in the hopping sequence, only one communications channel is used for communications between a pair of participants.

76. The communications channel selector apparatus of claim 75, wherein the plurality of communications channels is associated with a communications system and wherein the communications channel selector apparatus further comprises:
means for generating first channel identification data that identifies the first set of two or more communications channels;
means for transmitting the first channel identification data to one or more participants in the communications system over one communications channel of the plurality of communications channels based on the hopping sequence according to the frequency hopping protocol;
means for generating second channel identification data that identifies the second set of two or more communications channels; and
means for transmitting the second channel identification data to one or more participants in the communications system over one communications channel of the plurality of communications channels based on the hopping sequence according to the frequency hopping protocol.

77. The communications channel selector apparatus of claim 75, wherein the communications channel selector apparatus further comprises:
means for determining the performance of the plurality of communications channels at the first time; and
means for determining the performance of the plurality of communications channels at the second time.

78. A communications apparatus comprising:
means for selecting, based on first performance data that indicates performance of a plurality of communications channels at a first time and at least a first performance criterion, a first set of two or more communications channels from the plurality of communications channels;
means for generating first identification data that identifies the first set of two or more communications channels;
means for providing the first identification data to a participant;
means for communicating with the participant over the first set of two or more communications channels, wherein the plurality of communications channels correspond to a set of frequencies to be used based on a hopping sequence according to a frequency hopping protocol;

wherein at each hop in the hopping sequence, only one communications channel is used for communications between a pair of participants; and wherein the first identification data is provided to the participant over one communications channel of the plurality of communications channels based on the hopping sequence according to the frequency hopping protocol.

79. The communications apparatus of claim 78, further comprising:

means for selecting, based on second performance data that indicates performance of the plurality of communications channels at a second time that is different than the first time and at least a second performance criterion, a second set of two or more communications channels from the plurality of communications channels;

means for generating second identification data that identifies the second set of two or more communications channels;

means for providing the second identification data to the participant over one communications channel of the plurality of communications channels based on the hopping sequence according to the frequency hopping protocol; and means for communicating with the participant over the second set of two or more communications channels.

80. The communications apparatus of claim 78, further comprising:

means for selecting, after expiration of a specified amount of time and based on second performance data that indicates performance of the plurality of communications channels and at least a second performance criterion, a second set of two or more communications channels from the plurality of communications channels;

means for generating, after expiration of the specified amount of time, second identification data that identifies the second set of two or more communications channels;

means for providing, after expiration of the specified amount of time, the second identification data to the participant over one communications channel of the plurality of communications channels based on the hopping sequence according to the frequency hopping protocol; and means for communicating, after expiration of the specified amount of time, with the participant over the second set of two or more communications channels.

81. The communications apparatus of claim 78, further comprising:

means for determining, based on second performance data that indicates performance of the first set of two or more communications channels at a second time that is later than the first time, a number of communications channels from the first set of two or more communications channels that satisfy at least a second performance criterion;

means for selecting, when the number of communications channels from the first set of two or more communications channels is less than a specified number and based on third performance data that indicates performance of the plurality of communications channels at a third time that is at or later than the second time and at least a third performance criterion, a second set of two or more communications channels from the plurality of communications channels;

means for generating, when the number of communications channels from the first set of two or more communications channels is less than the specified number, second identification data that identifies the second set of two or more communications channels;

means for providing, when the number of communications channels from the first set of two or more communications channels is less than the specified number, the second identification data to the participant over one communications channel of the plurality of communications channels based on the hopping sequence according to the frequency hopping protocol; and means for communicating, when the number of communications channels from the first set of two or more communications channels is less than the specified number, with the participant over the second set of two or more communications channels.

82. The communications apparatus of claim 78, further comprising:

means for selecting, when performance data for at least one communications channel of the first set of two or more communications channels satisfies at least a second performance criterion and based on the second performance data that indicates performance of the plurality of communications channels at a different time and at least a third performance criterion, a second set of two or more communications channels from the plurality of communications channels;

means for generating, when performance data for at least one communications channel of the first set of two or more communications channels satisfies at least the second performance criterion, second identification data that identifies the second set of two or more communications channels;

means for providing, when performance data for at least one communications channel of the first set of two or more communications channels satisfies at least the second performance criterion, the second identification data to the participant over one communications channel of the plurality of communications channels based on the hopping sequence according to the frequency hopping protocol; and means for communicating, when performance data for at least one communications channel of the first set of two or more communications channels satisfies at least the second performance criterion, with the participant over the second set of two or more communications channels.

83. The communications device apparatus of claim 78, further comprising:

means for transmitting first data to the participant over at least one communications channel of the plurality of communications channels;

means for receiving, from the participant, second data that indicates a measurement of performance of the at least one communications channel based on transmitting the first data over the at least one communications channel; and means for determining the first performance data based on at least the second data.

84. The communications device apparatus of claim 78, further comprising:

means for transmitting first data to the participant over at least one communications channel of the plurality of communications channels;

means for receiving, from the participant over at least one additional communications channel of the plurality of communications channels, second data that indicates a measurement of performance of the at least one communications channel based on transmitting the first data over the at least one communications channel;

means for generating an additional measurement of performance of the at least one additional communications channel based on receiving the second data over the at least one additional communications channel; and means for determining the first performance data based on at least the second data and the additional measurement.

85. A computer-readable medium carrying one or more sequences of instructions for selecting communications channels for a communications system, wherein execution of the one or more sequences of instructions by one or more processors causes the one or more processors to perform the steps of:

selecting, based upon performance of a plurality of communications channels at a first time and channel selection criteria, a first set of two or more communications channels from the plurality of communications channels;

selecting, based upon performance of the plurality of communications channels at a second time that is later than the first time and the channel selection criteria, a second set of two or more communications channels from the plurality of communications channels;

wherein the communications system is a frequency hopping communications system and the plurality of communications channels correspond to a set of frequencies to be used based on a hopping sequence according to a frequency hopping protocol; and wherein at each hop in the hopping sequence, only one communications channel is used for communications between a pair of participants.

86. The computer-readable medium as recited in claim 85, wherein the plurality of communications channels communicatively couple at least a plurality of wireless devices.

87. The computer-readable medium as recited in claim 86, wherein the plurality of wireless devices includes one or more mobile devices.

88. The computer-readable medium as recited in claim 85, further comprising one or more sequences of instructions that, when executed by the one or more processors, cause the one or more processors to perform the steps of:

generating first channel identification data that identifies the first set of two or more communications channels;

transmitting the first channel identification data to one or more participants in the communications system over one communications channel of the plurality of communications channels based on the hopping sequence according to the frequency hopping protocol;

generating second channel identification data that identifies the second set of two or more communications channels; and transmitting the second channel identification data to one or more participants in the communications system over one communications channel of the plurality of communications channels based on the hopping sequence according to the frequency hopping protocol.

89. The computer-readable medium as recited in claim 85, wherein the channel selection criteria include a channel performance threshold.

90. The computer-readable medium as recited in claim 85, further comprising one or more sequences of instructions that, when executed by the one or more processors, cause the one or more processors to perform the steps of:

generating first channel performance data that indicates the performance of the plurality of communications channels at the first time; and generating second channel performance data that indicates the performance of the plurality of communications channels at the second time.

91. The computer-readable medium as recited in claim 85, further comprising one or more sequences of instructions that, when executed by the one or more processors, cause the one or more processors to perform the steps of:

communicating, prior to the second time, over the first set of two or more communications channels, according to the frequency hopping protocol; and communicating, after a third time that is not earlier than the second time, over the second set of two or more communications channels, according to the frequency hopping protocol.

92. The computer-readable medium as recited in claim 85, further comprising one or more sequences of instructions that, when executed by the one or more processors, cause the one or more processors to perform the steps of:

determining the performance of the plurality of communications channels at the first time; and determining the performance of the plurality of communications channels at the second time.

93. A computer-readable medium carrying one or more sequences of instructions for communicating among a network of communications devices according to a frequency hopping protocol, wherein execution of the one or more sequences of instructions by one or more processors causes the one or more processors to perform the steps of:

determining first performance data for a plurality of communications channels based on one or more performance measurements of the plurality of communications channels, wherein the plurality of communications channels correspond to a set of frequencies to be used based on a hopping sequence according to the frequency hopping protocol, and wherein at each hop in the hopping sequence, only one communications channel is used for communications between a pair of communications devices;

determining classifications, based on the first performance data and at least a first performance criterion, of at least two communications channels of the plurality of communications channels;

selecting, based upon the classifications of the at least two communications channels, a first set of two or more communications channels;

generating first identification data that identifies the first set of two or more communications channels;

providing the first identification data to a communications device of the network of communications devices over one communications channel of the plurality of communications channels based on the hopping sequence according to the frequency hopping protocol;

communicating with the communications device over the first set of two or more communications channels according to the frequency hopping protocol;

determining performance data for the first set of two or more communications channels; and if the performance data indicates that at least a specified number of communications channels of the first set of two or more communications channels do not satisfy specified performance criteria, then
  determining second performance data for the plurality of communications channels based on one or more additional performance measurements of the plurality of communications channels;
  determining additional classifications, based on the second performance data and at least a second performance criterion, of at least two communications channels of the plurality of communications channels;
  selecting, based upon the additional classifications of the at least two communications channels, a second set of two or more communications channels from the plurality of communications channels;
  generating second identification data that identifies the second set of two or more communications channels;
  providing the second identification data to the communications device over one communications channel of the plurality of communications channels based on the hopping sequence according to the frequency hopping protocol; and
  communicating with the communications device over the second set of two or more communications channels according to the frequency hopping protocol.

94. A computer-readable medium carrying one or more sequences of instructions for selecting communications channels for a frequency hopping communications system, wherein execution of the one or more sequences of instructions by one or more processors causes the one or more processors to perform the steps of:
  selecting, based upon performance of a plurality of communications channels at a first time and channel selection criteria, a first set of two or more communications channels from the plurality of communications channels, wherein the plurality of communications channels correspond to a set of frequencies to be used based on a hopping sequence according to a frequency hopping protocol, and wherein at each hop in the hopping sequence, only one communications channel is used for communications between a pair of participants;
  determining, based upon performance of the first set of two or more communications channels at a second time that is later than the first time, a number of communications channels from the first set of two or more communications channels that satisfy the channel selection criteria; and
  if the number of communications channels from the first set of two or more communications channels that satisfy the channel selection criteria at the second time is less than a specified number, then
    selecting, based upon performance of the plurality of communications channels at a third time that is later than the second time and the channel selection criteria, a second set of two or more communications channels from the plurality of communications channels in the frequency hopping communications system.

95. A computer-readable medium carrying one or more sequences of instructions for communicating with a participant in a communications arrangement, wherein execution of the one or more sequences of instructions by one or more processors causes the one or more processors to perform the steps of:
  selecting, based on first performance data that indicates performance of a plurality of communications channels at a first time and at least a first performance criterion, a first set of two or more communications channels from the plurality of communications channels;
  generating first identification data that identifies the first set of two or more communications channels;
  providing the first identification data to the participant;
  communicating with the participant over the first set of two or more communications channels, wherein the plurality of communications channels correspond to a set of frequencies to be used based on a hopping sequence according to a frequency hopping protocol;
  wherein at each hop in the hopping sequence, only one communications channel is used for communications between a pair of participants; and
  wherein the first identification data is provided to the participant over one communications channel of the plurality of communications channels based on the hopping sequence according to the frequency hopping protocol.

96. The computer-readable medium of claim 96, wherein:
  vthe classifications include good and bad;
  the instructions that cause the one or more processors to perform the step of selecting the first set of two or more communications channels includes one or more sequences of instructions that, when executed by the one or more processors, cause the one or more processors to perform the step of selecting the first set of two or more communications channels from communications channels that are determined to have classifications of good; and
  the instructions that cause the one or more processors to perform the step of selecting the second set of two or more communications channels includes one or more sequences of instructions that, when executed by the one or more processors, cause the one or more processors to perform the step of selecting the second set of two or more communications channels from communications channels that are determined to have classifications of good.

97. The computer-readable medium of claim 95, wherein:
  the participant is designated to be a slave; and
  at least one processor in a master performs executes the instructions to perform the steps of selecting, generating, providing, and communicating.

98. The computer-readable medium of claim 95, wherein the instructions that cause the one or more processors to perform the step of selecting the first set of two or more communications channels comprises one or more sequences of instructions that, when executed by the one or more processors, cause the one or more processors to perform the steps of:
  classifying, based on the first performance data and at least the first performance criterion, at least two communications channels of the plurality of communications channels as good or bad; and
  selecting at least two communications channels of the plurality of communications channels that are classified as good.

99. The computer-readable medium of claim 95, wherein the instructions that cause the one or more processors to perform the step of communicating with the participant over the first set of two or more communications channels includes one or more sequences of instructions that, when executed by the one or more processors, cause the one or more processors to perform the step of communicating with the participant over the first set of two or more communications channels according to a frequency hopping protocol that conforms to a Bluetooth communications standard for transmissions over a 2.4 GHz band.

100. The computer-readable medium of claim 95, wherein the instructions that cause the one or more processors to perform the step of communicating with the participant over the first set of two or more communications channels includes one or more sequences of instructions that, when executed by the one or more processors, cause the one or more processors to perform the step of communicating with the participant over the over the first set of two or more communications channels according to a frequency hopping protocol defined by Institute of Electrical and Electronics Engineers 802.15.1 Wireless Personal Area Network Standard.

101. The computer-readable medium of claim 95, wherein the participant is a first participant, and wherein the computer-readable medium further comprises one or more sequences of instructions that, when executed by the one or more processors, cause the one or more processors to perform the step of:
 communicating with a second participant over the plurality of communications channels.

102. The computer-readable medium of claim 95, wherein the participant is a first participant, and wherein the computer-readable medium further comprises one or more sequences of instructions that, when executed by the one or more processors, cause the one or more processors to perform the steps of:
 providing the first identification data to a second participant over one communications channel of the plurality of communications channels based on the hopping sequence according to the frequency hopping protocol; and
 communicating with the second participant over the first set of two or more communications channels.

103. The computer-readable medium of claim 95, wherein the first performance data for the plurality of communications channels is determined by one or more sequences of instructions that, when executed by the one or more processors, cause the one or more processors to perform the steps of:
 performing a specified number of communications channel performance tests on each communication channel in the plurality of communications channels;
 receiving channel performance data from the participant;
 determining the first performance data based on results of the specified number of communications channel performance tests and the channel performance data from the participant.

104. The computer-readable medium of claim 95, wherein the first performance data indicates performance for each communications channel of the plurality of communications channels.

105. The computer-readable medium of claim 95, wherein the participant is selected from the group consisting of a wireless device and a mobile device.

106. The computer-readable medium of claim 95, wherein the one or more sequences of instructions that cause the one or more processors to perform the step of providing the first identification data to the participant comprises one or more sequences of instructions that, when executed by the one or more processors, cause the one or more processors to perform the computer-implemented steps of:
 encrypting the first identification data; and
 providing the encrypted first identification data to the participant.

107. The computer-readable medium of claim 95, further comprising one or more sequences of instructions that, when executed by the one or more processors, cause the one or more processors to perform the steps of:
 selecting, based on second performance data that indicates performance of the plurality of communications channels at a second time that is different than the first time and at least a second performance criterion, a second set of two or more communications channels from the plurality of communications channels;
 generating second identification data that identifies the second set of two or more communications channels;
 providing the second identification data to the participant over one communications channel of the plurality of communications channels based on the hopping sequence according to the frequency hopping protocol; and
 communicating with the participant over the second set of two or more communications channels, according to the frequency hopping protocol.

108. The computer-readable medium of claim 107, wherein the participant is a first participant, and wherein the computer-readable medium further comprises one or more sequences of instructions that, when executed by the one or more processors, cause the one or more processors to perform the computer-implemented steps of:
 providing the first identification data to a second participant over one communications channel of the plurality of communications channels based on the hopping sequence according to the frequency hopping protocol; and
 communicating with the second participant over the first set of two or more communications channels while communicating with the first participant over the second set of two or more communications channels.

109. The computer-readable medium of claim 107, wherein:
 the second set of two or more communications channels is different than the first set of two or more communications channels; and
 the first performance criterion is different than the second performance criterion.

110. The computer-readable medium of claim 95, wherein the one or more sequences of instructions that cause the one or more processors to perform the step of selecting the first set of two or more communications channels comprises one or more sequences of instructions that, when executed by the one or more processors, cause the one or more processors to perform the computer-implemented steps of:
 classifying the performance of at least one communications channel of the plurality of communications channels based on the first performance data and one or more classification criteria that includes at least the first performance criterion; and
 selecting the first set of two or more communications channels based on the at least one classified communications channel and one or more selection criteria.

111. The computer-readable medium of claim 95, further comprising one or more sequences of instructions that, when executed by the one or more processors, cause the one or more processors to perform the steps of:
 after expiration of a specified amount of time,
  selecting, based on second performance data that indicates performance of the plurality of communications channels and at least a second performance criterion, a second set of two or more communications channels from the plurality of communications channels;

generating second identification data that identifies the second set of two or more communications channels;

providing the second identification data to the participant over one communications channel of the plurality of communications channels based on the hopping sequence according to the frequency hopping protocol; and communicating with the participant over the second set of two or more communications channels.

112. The computer-readable medium of claim 95, further comprising one or more sequences of instructions that, when executed by the one or more processors, cause the one or more processors to perform the steps of:

determining, based on second performance data that indicates performance of the first set of two or more communications channels at a second time that is later than the first time, a number of communications channels from the first set of two or more communications channels that satisfy at least a second performance criterion;

if the number of communications channels from the first set of two or more communications channels is less than a specified number, then:

selecting, based on third performance data that indicates performance of the plurality of communications channels at a third time that is at or later than the second time and at least a third performance criterion, a second set of two or more communications channels from the plurality of communications channels;

generating second identification data that identifies the second set of two or more communications channels;

providing the second identification data to the participant over one communications channel of the plurality of communications channels based on the hopping sequence according to the frequency hopping protocol; and communicating with the participant over the second set of two or more communications channels.

113. The computer-readable medium of claim 95, further comprising one or more sequences of instructions that, when executed by the one or more processors, cause the one or more processors to perform the steps of:

if performance data for at least one communications channel of the first set of two or more communications channels satisfies at least a second performance criterion, then selecting, based on second performance data that indicates performance of the plurality of communications channels at a different time and at least a third performance criterion, a second set of two or more communications channels from the plurality of communications channels;

generating second identification data that identifies the second set of two or more communications channels;

providing the second identification data to the participant over one communications channel of the plurality of communications channels based on the hopping sequence according to the frequency hopping protocol; and communicating with the participant over the second set of two or more communications channels.

114. The computer-readable medium of claim 95, wherein the first performance data for the plurality of communications channels is determined by one or more sequences of instructions that, when executed by the one or more processors, cause the one or more processors to perform the steps of:

transmitting first data to the participant over at least one communications channel of the plurality of communications channels;

receiving, from the participant, second data that indicates a measurement of performance of the at least one communications channel, wherein the measurement is based on transmitting the first data over the at least one communications channel; and determining the first performance data based on at least the second data.

115. The computer-readable medium of claim 95, wherein the first performance data for the plurality of communications channels is determined by one or more sequences of instructions that, when executed by the one or more processors, cause the one or more processors to perform the steps of:

transmitting first data to the participant over at least one communications channel of the plurality of communications channels;

receiving, from the participant over at least one additional communications channel of the plurality of communications channels, second data that indicates a measurement of performance of the at least one communications channel based on transmitting the first data over the at least one communications channel;

generating an additional measurement of performance of the at least one additional communications channel based on receiving the second data over the at least one additional communications channel; and determining the first performance data based on at least the second data and the additional measurement.

116. The computer-readable medium of claim 95, wherein the first performance data for the plurality of communications channels is determined by one or more sequences of instructions that, when executed by the one or more processors, cause the one or more processors to perform the steps of:

transmitting first data to the participant over at least one communications channel of the plurality of communications channels, wherein the first data includes one or more copies of a specified data string;

receiving, from the participant, second data that indicates a measurement of performance of the at least one communications channel based on whether errors occur in the one or more copies of the specified data string of the first data as a result of transmitting the first data to the participant over the at least one communications channel; and determining the first performance data based on at least the second data.

117. The computer-readable medium of claim 116, wherein the first data is a data packet and wherein the one or more copies of the specified data string are included in a portion of the data packet selected from the group consisting of a payload portion of the data packet and a preamble portion of the data packet.

118. The computer-readable medium of claim 95, wherein the first performance data for the plurality of communications channels is based on a channel performance testing technique selected from the group consisting of a received signal strength indicator, a header error check, a cyclic redundancy check, a packet loss ratio, a number of error bits, and forward error correction.

119. The computer-readable medium of claim 95, wherein the first performance data for the plurality of communications channels is determined by one or more sequences of instructions that, when executed by the one or more processors, cause the one or more processors to perform the steps of:
performing a specified number of communications channel performance tests on each communication channel in the plurality of communications channels; and
determining the first performance data based on results of the specified number of communications channel performance tests.

120. A method for selecting communications channels for a frequency hopping communications system, the method comprising the computer-implemented steps of:
selecting, based upon performance of a plurality of communications channels at a first time and channel selection criteria, a first set of two or more communications channels from the plurality of communications channels;
after selecting the first set of two or more communications channels, causing the first set of two or more communications channels to be loaded into a first register of a first participant and a second register of a second participant;
causing the first participant and the second participant to communicate over the first set of two or more communications channels based on a hopping sequence according to a frequency hopping protocol;
selecting, based upon performance of the plurality of communications channels at a second time that is later than the first time and the channel selection criteria, a second set of two or more communications channels from the plurality of communications channels;
after selecting the second set of two or more communications channels, causing the second set of two or more communications channels to be loaded into the first register of the first participant and the second register of the second participant; and
causing the first participant and the second participant to communicate over the second set of two or more communications channels based on the hopping sequence according to the frequency hopping protocol.

121. The method of claim 120, wherein the frequency hopping protocol is defined by Institute of Electrical and Electronics Engineers 802.15.1 Wireless Personal Area Network Standard.

122. The method of claim 120, wherein the frequency hopping protocol conforms to a Bluetooth communications standard for transmissions over a 2.4 GHz band.

123. The method as recited in claim 120, wherein:
a first number of communications channels in the first set of two or more communications channels is less than a first number of slots in the first register and a second number of slots in the second register;
causing the first set of two or more communications channels to be loaded into the first register of the first participant and the second register of the second participant further comprises:
causing the first set of two or more communications channels to be loaded into the first number of slots of the first register of the first participant and the second number of slots of the second register of the second participant; and
causing a third number of communications channels of the first set of two or more communications channels to be loaded into the third number of slots following the first number of slots of the first register of the first participant;
wherein the third number is equal to the first number of slots in the first register minus the first number of communications channels in the first set of two or more communications channels;
causing a fourth number of communications channels of the first set of two or more communications channels to be loaded into the fourth number of slots following the second number of slots of the second register of the second participant; and
wherein the fourth number is equal to the second number of slots in the second register minus the second number of communications channels in the first set of two or more communications channels.

124. The method as recited in claim 123, wherein:
a second number of communications channels in the second set of two or more communications channels is less than the first number of slots in the first register and the second number of slots in the second register;
causing the second set of two or more communications channels to be loaded into the first register of the first participant and the second register of the second participant further comprises:
causing the second set of two or more communications channels to be loaded into the first number of slots of the first register of the first participant and the second number of slots of the second register of the second participant; and
causing a fifth number of communications channels of the second set of two or more communications channels to be loaded into the fifth number of slots following the first number of slots of the first register of the first participant;
wherein the fifth number is equal to the first number of slots in the first register minus the second number of communications channels in the second set of two or more communications channels; and
causing a sixth number of communications channels of the second set of two or more communications channels to be loaded into the sixth number of slots following the second number of slots of the second register of the second participant; and
wherein the sixth number is equal to the second number of slots in the second register minus the second number of communications channels in the second set of two or more communications channels.

125. The method as recited in claim 120, wherein:
prior to selecting the first set of two or more communications channels, the first register of the first participant and the second register of the second participant are loaded with a default set of two or more communications channels;
causing the first set of two or more communications channels to be loaded into the first register of the first participant and the second register of the second participant further comprises causing one or more communications channels of the default set of two or more communications channels to be replaced by one or more communications channels of the first set of two or more communications channels; and
causing the second set of two or more communications channels to be loaded into the first register of the first participant and the second register of the second participant further comprises causing one or more communications channels of the default set of two or more communications channels to be replaced by one or more communications channels of the second set of two or more communications channels.

126. The method as recited in claim 125, wherein:
causing the one or more communications channels of the default set of two or more communications channels to be replaced by the one or more communications channels of the first set of two or more communications channels further comprises:
   randomly selecting the one or more communications channels of the first set of two or more communications channels;
   causing the one or more communications channels of the default set of two or more communications channels to be replaced by the one or more randomly selected communications channels of the first set of two or more communications channels;
causing the one or more communications channels of the default set of two or more communications channels to be replaced by the one or more communications channels of the second set of two or more communications channels further comprises:
   randomly selecting the one or more communications channels of the second set of two or more communications channels;
   causing the one or more communications channels of the default set of two or more communications channels to be replaced by the one or more randomly selected communications channels of the second set of two or more communications channels.

127. The method as recited in claim 120, wherein prior to selecting the first set of two or more communications channels, the first register and the second register are loaded with a default set of two or more communications channels, and the method further comprises the computer-implemented steps of:
   after causing the first participant and the second participant to communicate over the first set of two or more communications channels and prior to selecting the second set of two or more communications channels,
      causing the first register of the first participant and the second register of the second participant to be loaded with the default set of two or more communications channels; and
   causing the first participant and the second participant to communicate over the default set of two or more channels.

128. The method as recited in claim 127, wherein causing the first register of the first participant and the second register of the second participant to be loaded with the default set of two or more communications channels further comprises the computer-implemented step of:
   after expiration of a specified amount of time after causing the first set of two or more communications channels to be loaded into the first register of the first participant and the second register of the second participant, causing the first register of the first participant and the second register of the second participant to be loaded with the default set of two or more communications channels.

* * * * *

UNITED STATES PATENT AND TRADEMARK OFFICE
CERTIFICATE OF CORRECTION

PATENT NO. : 7,027,418 B2
APPLICATION NO. : 09/948488
DATED : April 11, 2006
INVENTOR(S) : Hongbing Gan et al.

It is certified that error appears in the above-identified patent and that said Letters Patent is hereby corrected as shown below:

Column 32, Line 36    Delete the first instance of "over the"

Column 46, line 22    Delete "claim 96" and insert --claim 93--

Column 46, line 23    Delete "vthe" and insert --the--

Column 47, line 12    Delete the first instance of "over the"

Signed and Sealed this

Twenty-sixth Day of September, 2006

JON W. DUDAS
*Director of the United States Patent and Trademark Office*